United States Patent [19]

Shah

[11] Patent Number: 5,492,273

[45] Date of Patent: Feb. 20, 1996

[54] HEATING VENTILATING AND/OR AIR CONDITIONING SYSTEM HAVING A VARIABLE SPEED INDOOR BLOWER MOTOR

[75] Inventor: Rajendra K. Shah, Indianapolis, Ind.

[73] Assignee: General Electric Company, Fort Wayne, Ind.

[21] Appl. No.: 357,044

[22] Filed: Dec. 13, 1994

Related U.S. Application Data

[63] Continuation of Ser. No. 29,152, Mar. 10, 1993, abandoned, which is a continuation-in-part of Ser. No. 889,708, May 27, 1992.

[51] Int. Cl.$^6$ .............................. B01F 3/02; F04B 49/06
[52] U.S. Cl. ........................ 236/44 A; 62/186; 236/11; 236/49.3; 417/45
[58] Field of Search ....................... 236/38, 78 D, 236/DIG. 9, 11, 49, 3, 44 A; 417/45; 62/186, 158; 165/26

[56] References Cited

U.S. PATENT DOCUMENTS

| | | | |
|---|---|---|---|
| 2,038,578 | 4/1936 | Lamb | 236/DIG. 9 |
| 3,853,174 | 12/1974 | Kramer | 165/39 |
| 3,877,243 | 4/1975 | Kramer | 62/180 |
| 4,015,182 | 3/1977 | Erdman | 318/334 |
| 4,075,864 | 2/1978 | Schrader | 62/180 |
| 4,167,966 | 9/1979 | Freeman | 165/2 |
| 4,250,544 | 2/1981 | Alley | 364/110 |
| 4,267,967 | 5/1981 | Beck et al. | 236/49 |
| 4,271,898 | 6/1981 | Freeman | 165/16 |
| 4,346,434 | 8/1982 | Morinaga | 364/183 |
| 4,389,853 | 6/1983 | Hile | 62/89 |
| 4,390,826 | 6/1983 | Erdman et al. | 318/439 |
| 4,415,844 | 11/1983 | Mendenhall et al. | 318/254 |
| 4,459,519 | 7/1984 | Erdman | 318/254 |
| 4,467,617 | 8/1984 | Morgan et al. | 62/180 |
| 4,495,450 | 1/1985 | Tokizaki et al. | 318/138 |
| 4,500,821 | 2/1985 | Bitting et al. | 318/254 |
| 4,540,921 | 9/1985 | Boyd, Jr. et al. | 318/254 |
| 4,636,936 | 1/1987 | Boyd, Jr. et al. | 364/148 |
| 4,642,536 | 2/1987 | Boyd, Jr. et al. | 318/254 |
| 4,642,537 | 2/1987 | Young | 318/254 |
| 4,648,551 | 3/1987 | Thompson et al. | 236/49 |
| 4,653,285 | 3/1987 | Pohl | 361/29 |
| 4,667,480 | 5/1987 | Bessler | 62/180 |
| 4,669,040 | 5/1987 | Pettit et al. | 318/610 X |
| 4,682,473 | 7/1987 | Rogers, III | 62/89 |
| 4,688,547 | 8/1987 | Ballard et al. | 126/116 A |
| 4,712,050 | 12/1987 | Nagasawa et al. | 318/254 |
| 4,722,018 | 1/1988 | Pohl | 361/29 |
| 4,736,143 | 1/1988 | Nakamura et al. | 318/432 |
| 4,743,815 | 5/1988 | Gee et al. | 318/254 |
| 4,754,405 | 6/1988 | Foster | 364/557 |
| 4,773,587 | 9/1988 | Lipman | 236/11 |
| 4,842,044 | 6/1989 | Flanders et al. | 236/11 X |

(List continued on next page.)

FOREIGN PATENT DOCUMENTS

| | | | |
|---|---|---|---|
| 0039950 | 3/1977 | Japan | 62/180 |
| 4052451 | 2/1992 | Japan | 236/38 |

*Primary Examiner*—William E. Wayner
*Attorney, Agent, or Firm*—Ralph E. Krisher, Jr.

[57] ABSTRACT

A system which drives an indoor blower of a heating, ventilating, and/or air conditioning (HVAC) system in response to a system control signal. The system control signal has a BLOWER DEMAND state and a BLOWER END DEMAND state. The system comprises a motor having a stationary assembly and a rotatable assembly. The rotatable assembly is in magnetic coupling relation to the stationary assembly and in driving relation to the indoor blower. The system controls in response to the system control signal the rate of air flow of the HVAC system. The system operates at a first air flow rate in response to the BLOWER DEMAND state of the system control signal and operates at a second air flow rate greater than the first air flow rate when the BLOWER DEMAND state has been present for a first period of time. Alternately, the motor operates at a third air flow rate less than the first air flow rate for a second period of time in response to the BLOWER END DEMAND state of the system control signal.

45 Claims, 23 Drawing Sheets

U.S. PATENT DOCUMENTS

| | | | |
|---|---|---|---|
| 4,860,231 | 8/1989 | Ballard et al. | 364/571 |
| 4,868,467 | 9/1989 | Davis | 318/254 |
| 4,879,502 | 11/1989 | Endo et al. | 318/808 |
| 4,902,952 | 2/1990 | Lavery | 318/645 |
| 4,941,325 | 7/1990 | Nuding | 62/158 |
| 4,950,918 | 8/1990 | O'Breartuin et al. | 307/242 |
| 4,992,715 | 2/1991 | Nakamura et al. | 318/432 X |
| 5,022,460 | 6/1991 | Brown | 165/26 X |
| 5,107,685 | 4/1992 | Kobayashi | 318/807 |
| 5,119,071 | 6/1992 | Takezawa | 318/811 |
| 5,151,017 | 9/1992 | Sears et al. | 417/45 |
| 5,170,344 | 12/1992 | Berton et al. | 364/400 |
| 5,202,951 | 4/1993 | Doyle | 388/811 |

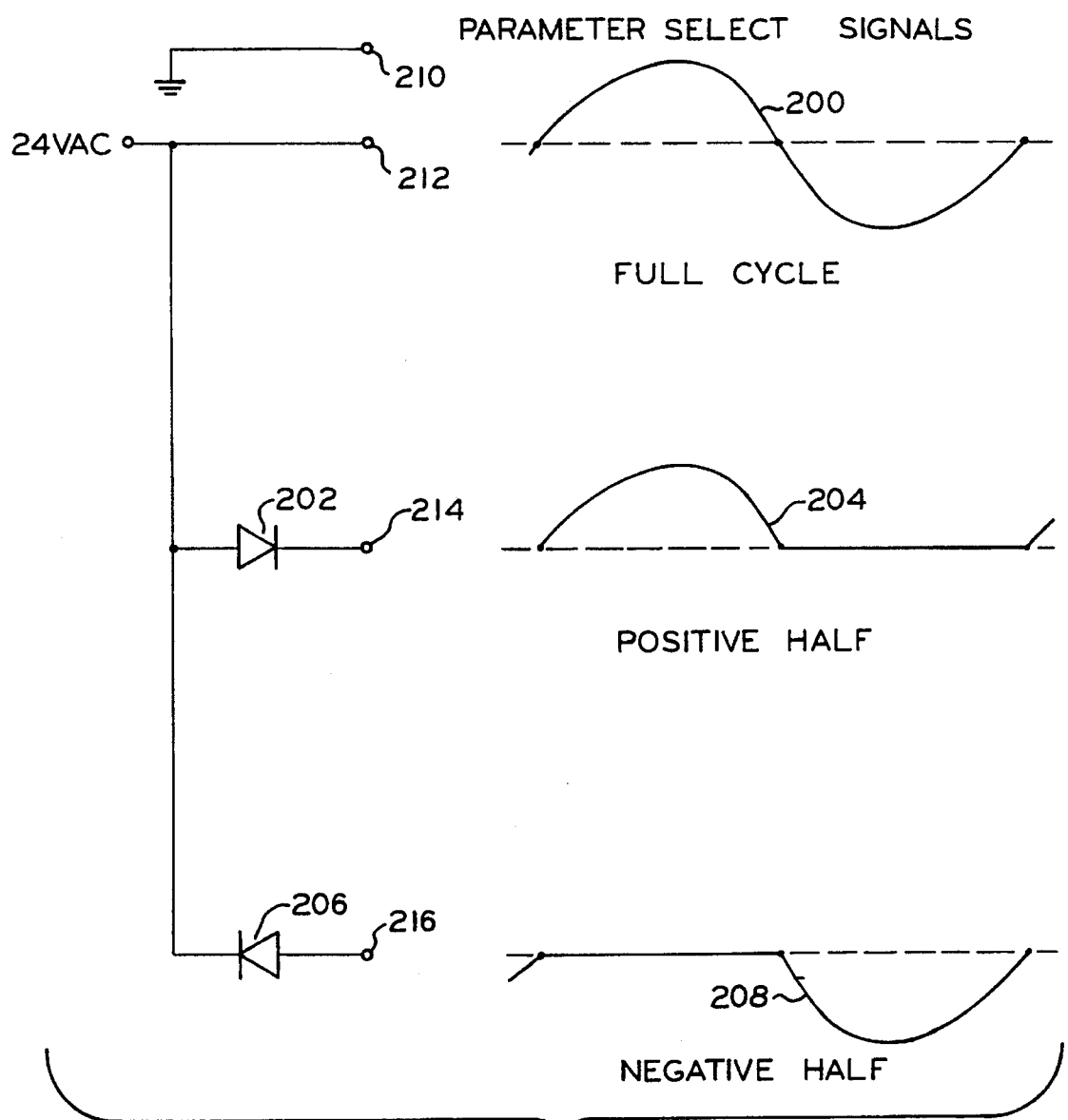
FIG_2
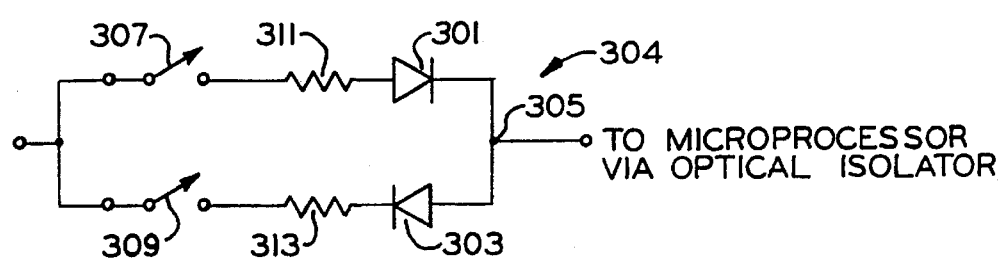
FIG_3

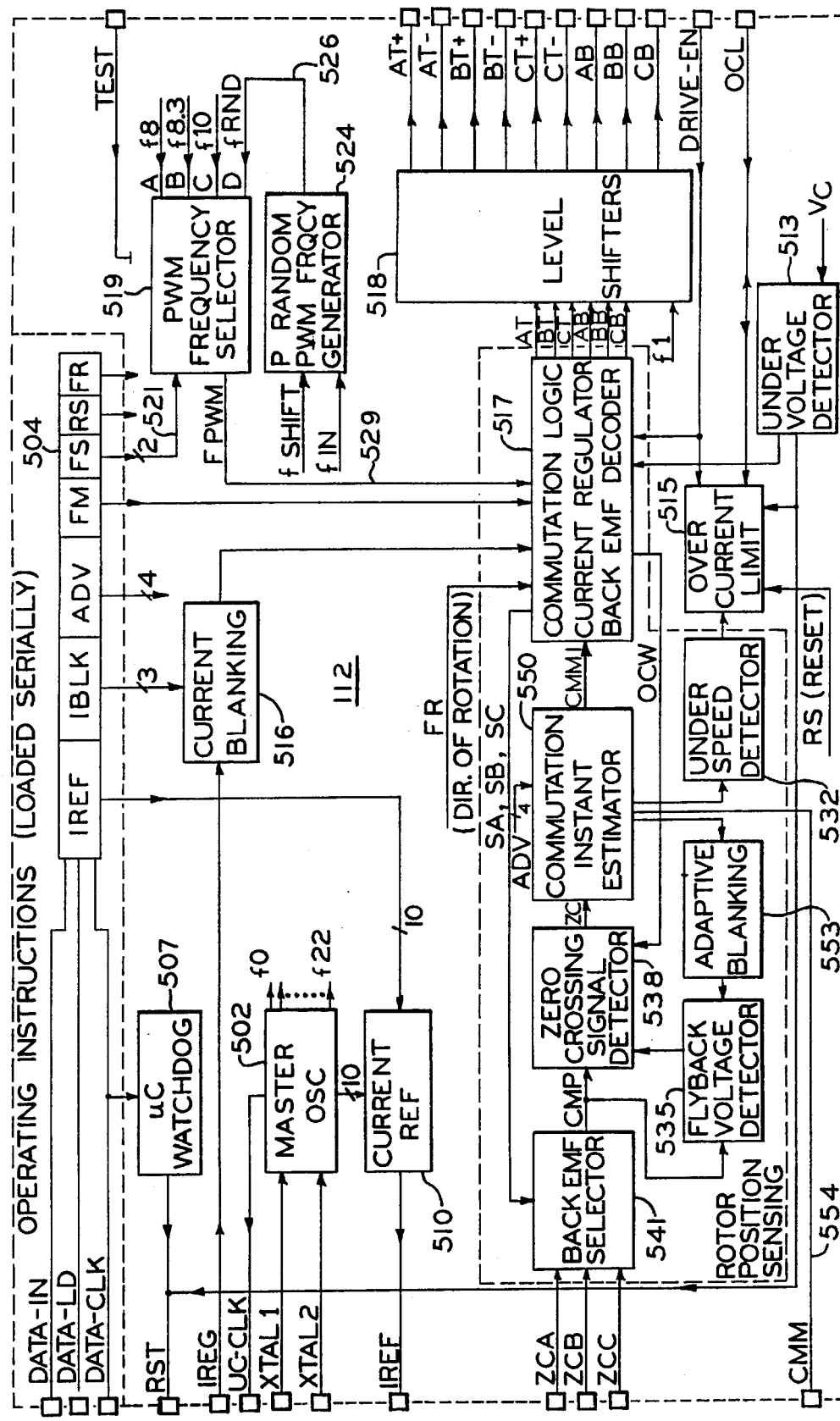
FIG_5 BLOCK DIAGRAM OF THE ASIC

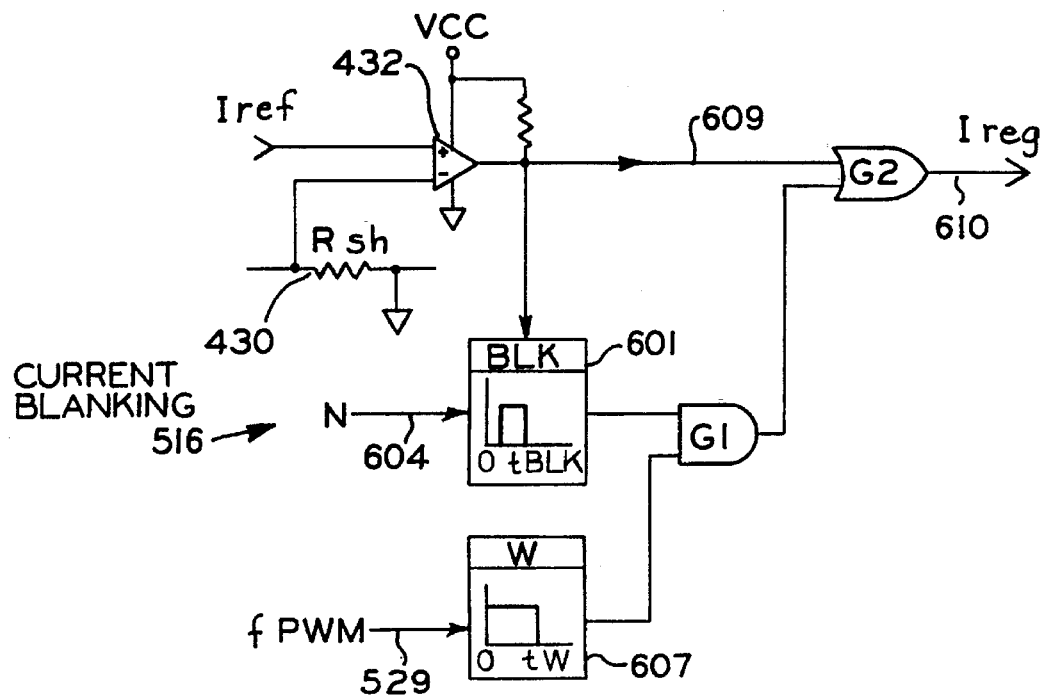
FIG_6
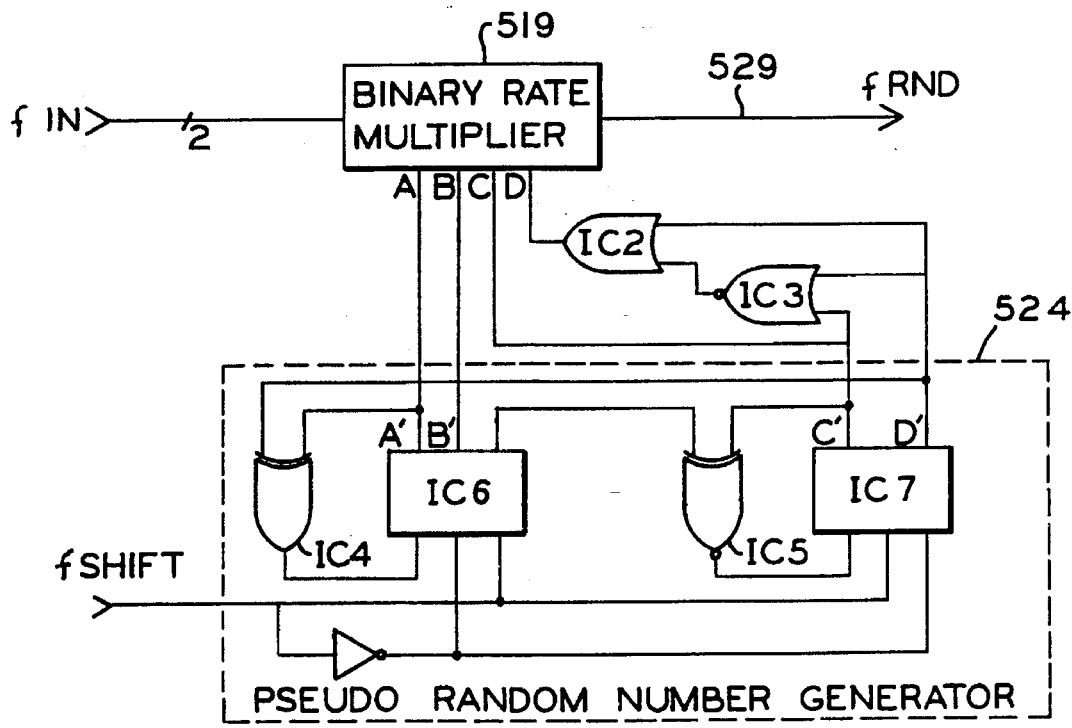
FIG_8

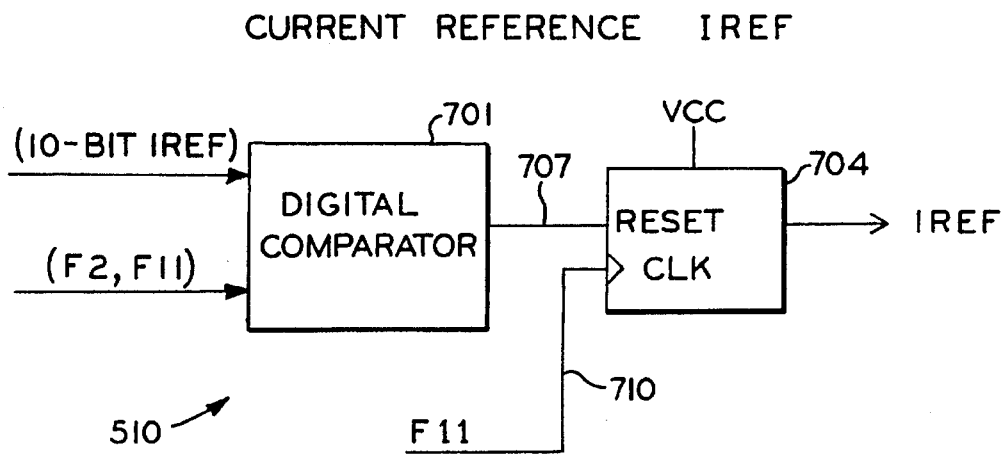
FIG_7
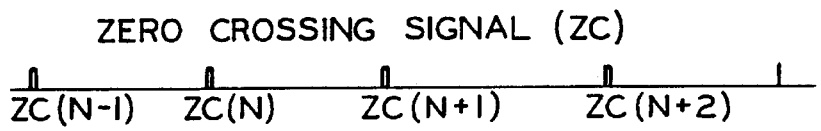
FIG_11a
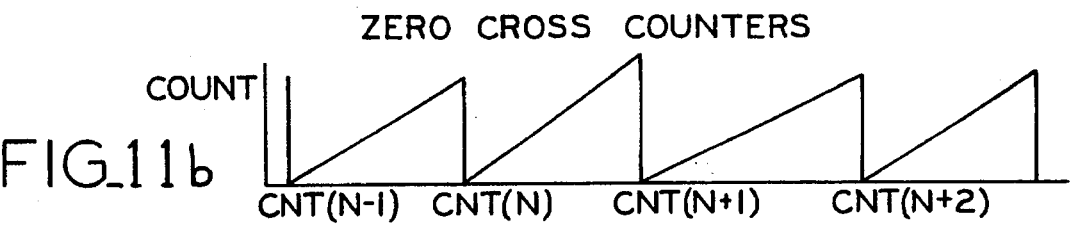
FIG_11b
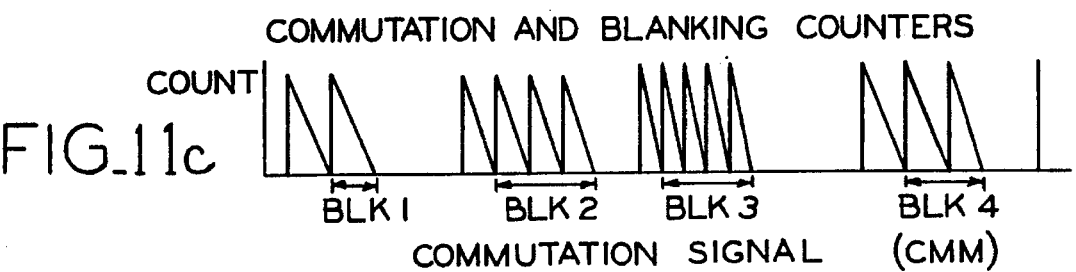
FIG_11c
FIG_11d
COMMUTATION STRATEGY

MOTOR BACK EMF VOLTAGE SENSING CIRCUIT

ZERO CROSSING DETECTION BY SYNCHRONOUS SAMPLING

FIG. 13A COMMUTATION STATE MACHINE

DIRECTION OF ROTATION

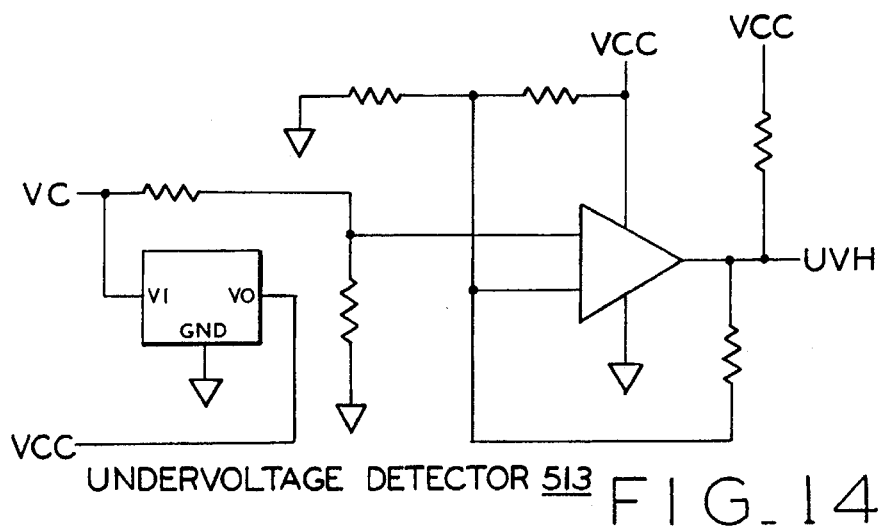
UNDERVOLTAGE DETECTOR 513
FIG_14
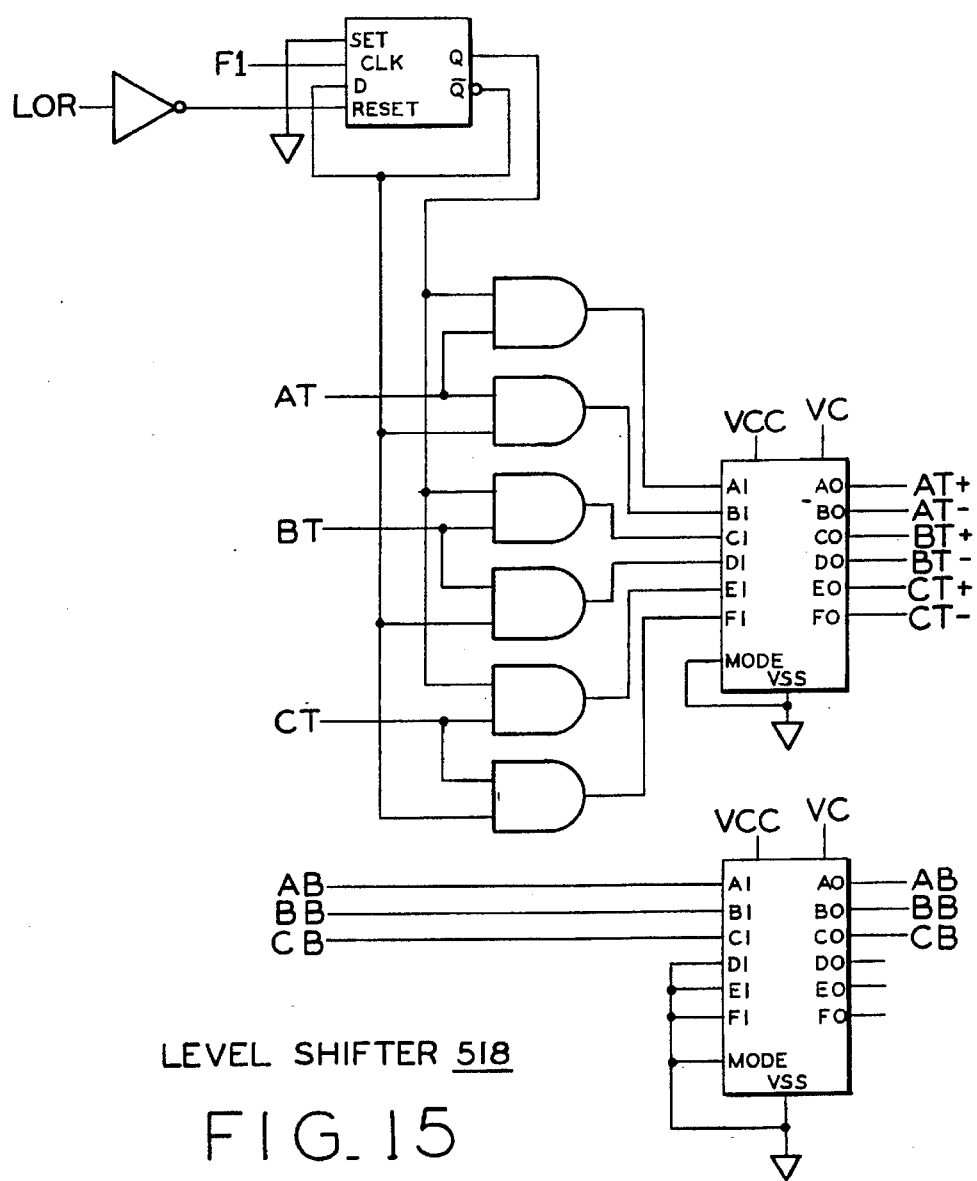
LEVEL SHIFTER 518
FIG_15

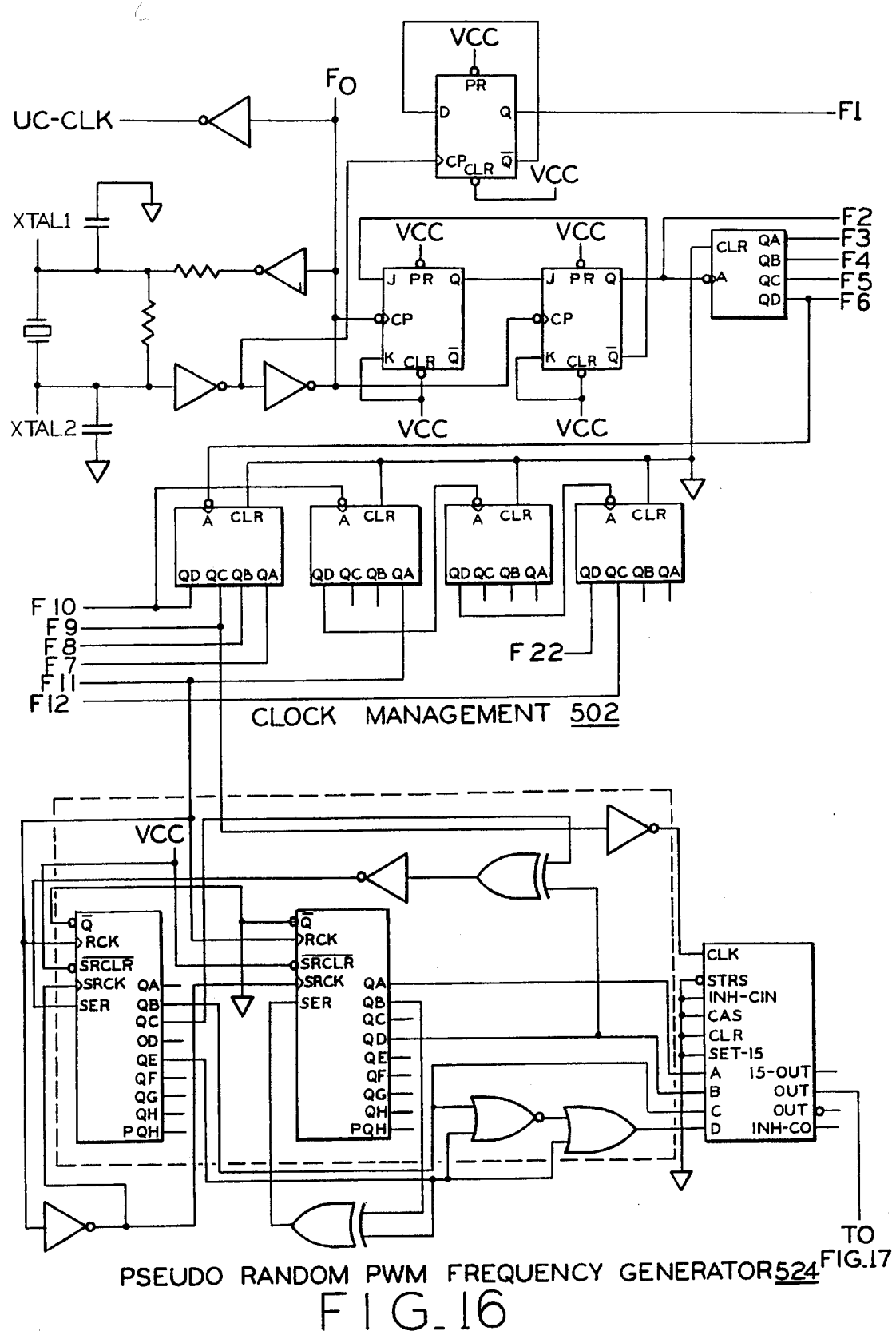
FIG_16
PSEUDO RANDOM PWM FREQUENCY GENERATOR 524

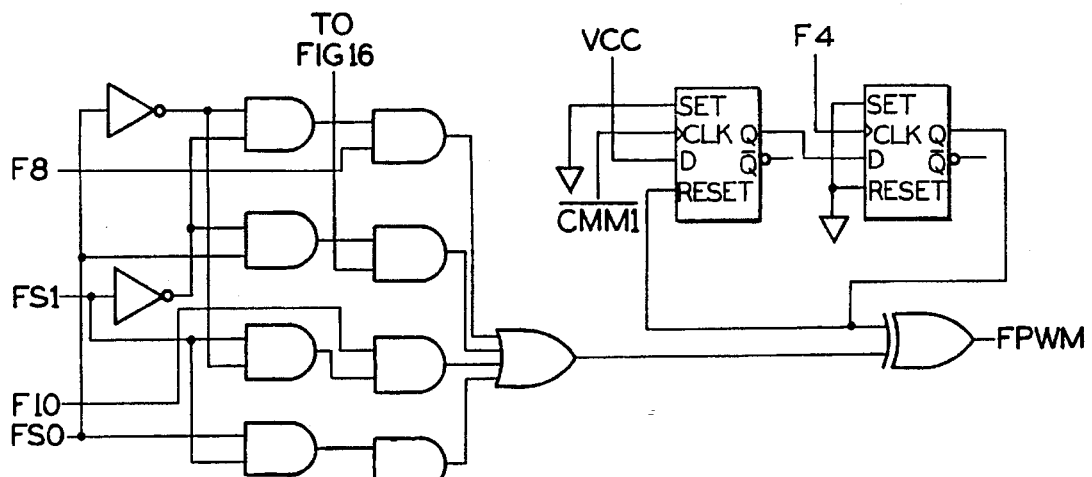
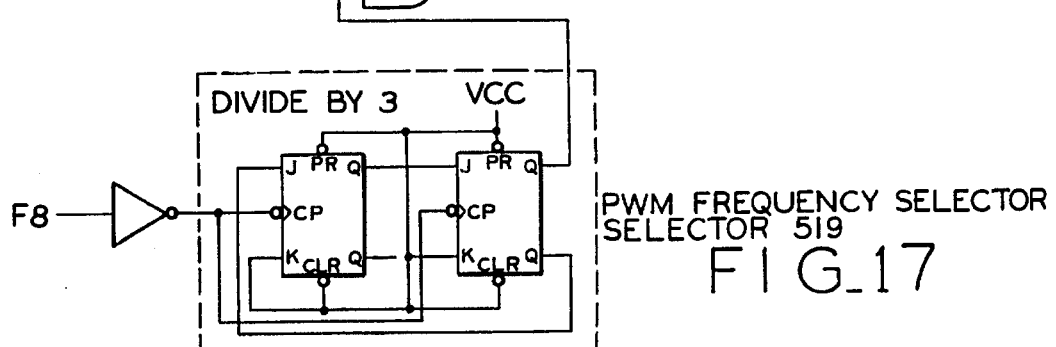
FIG_17
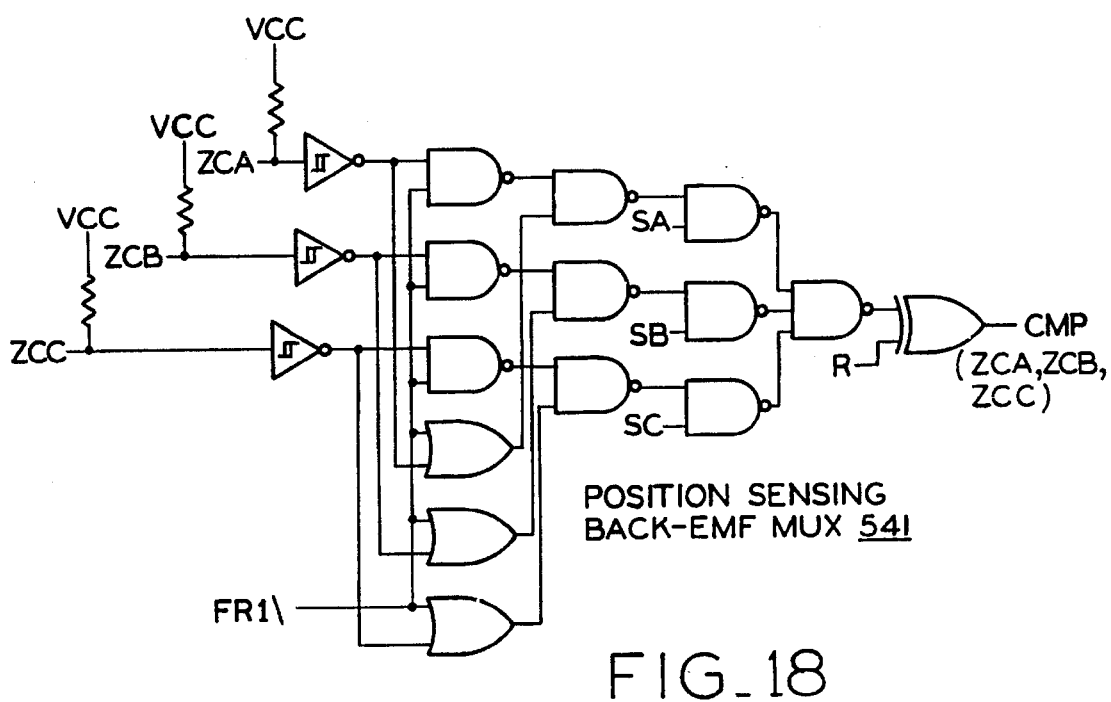
FIG_18

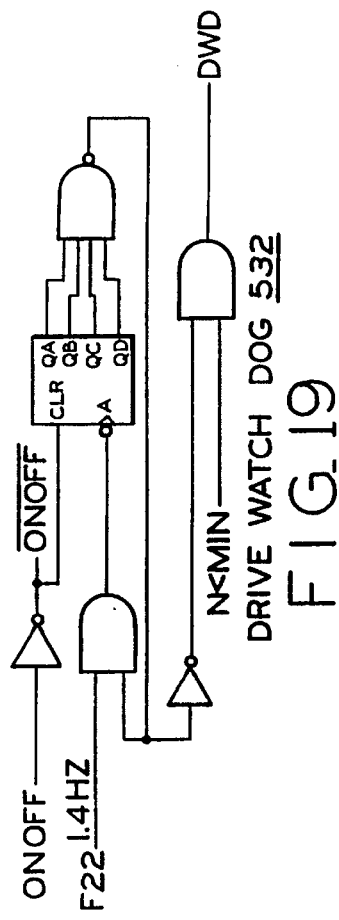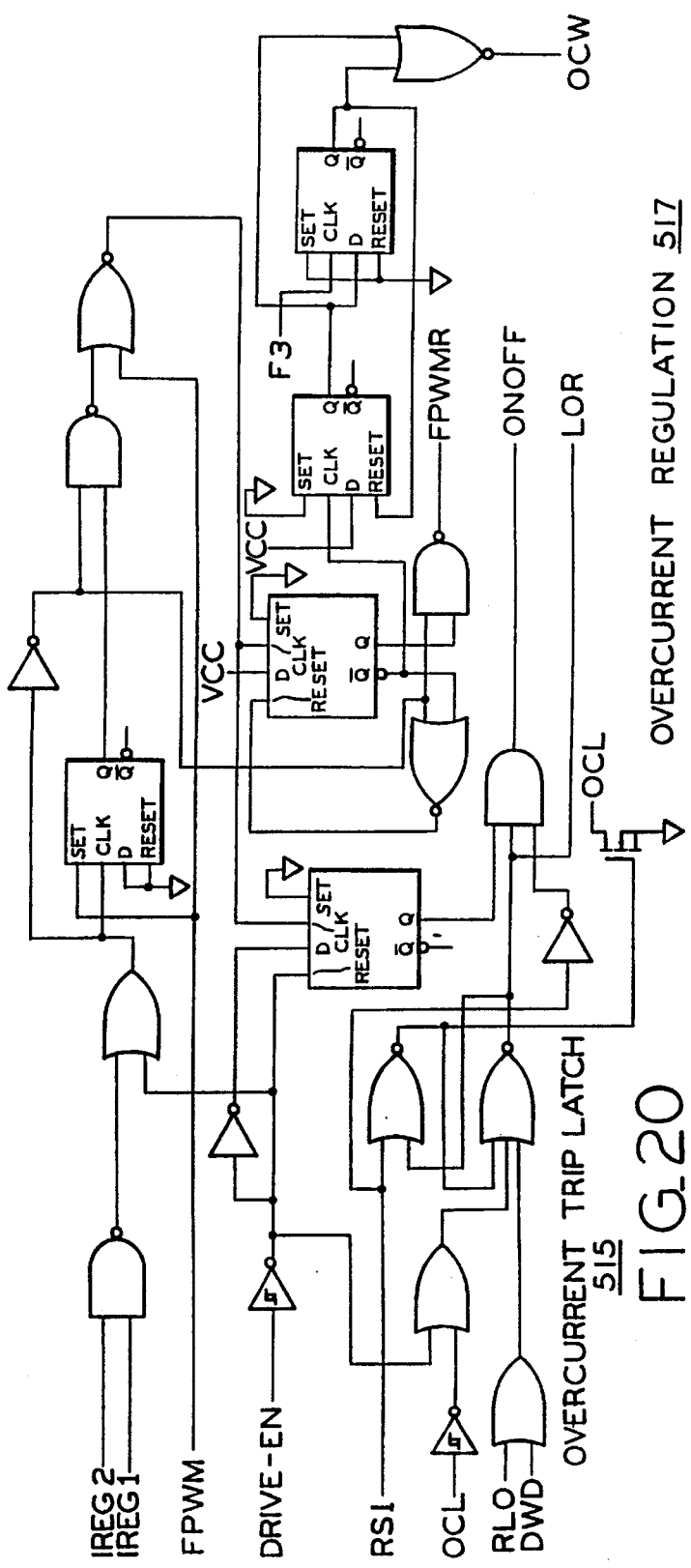

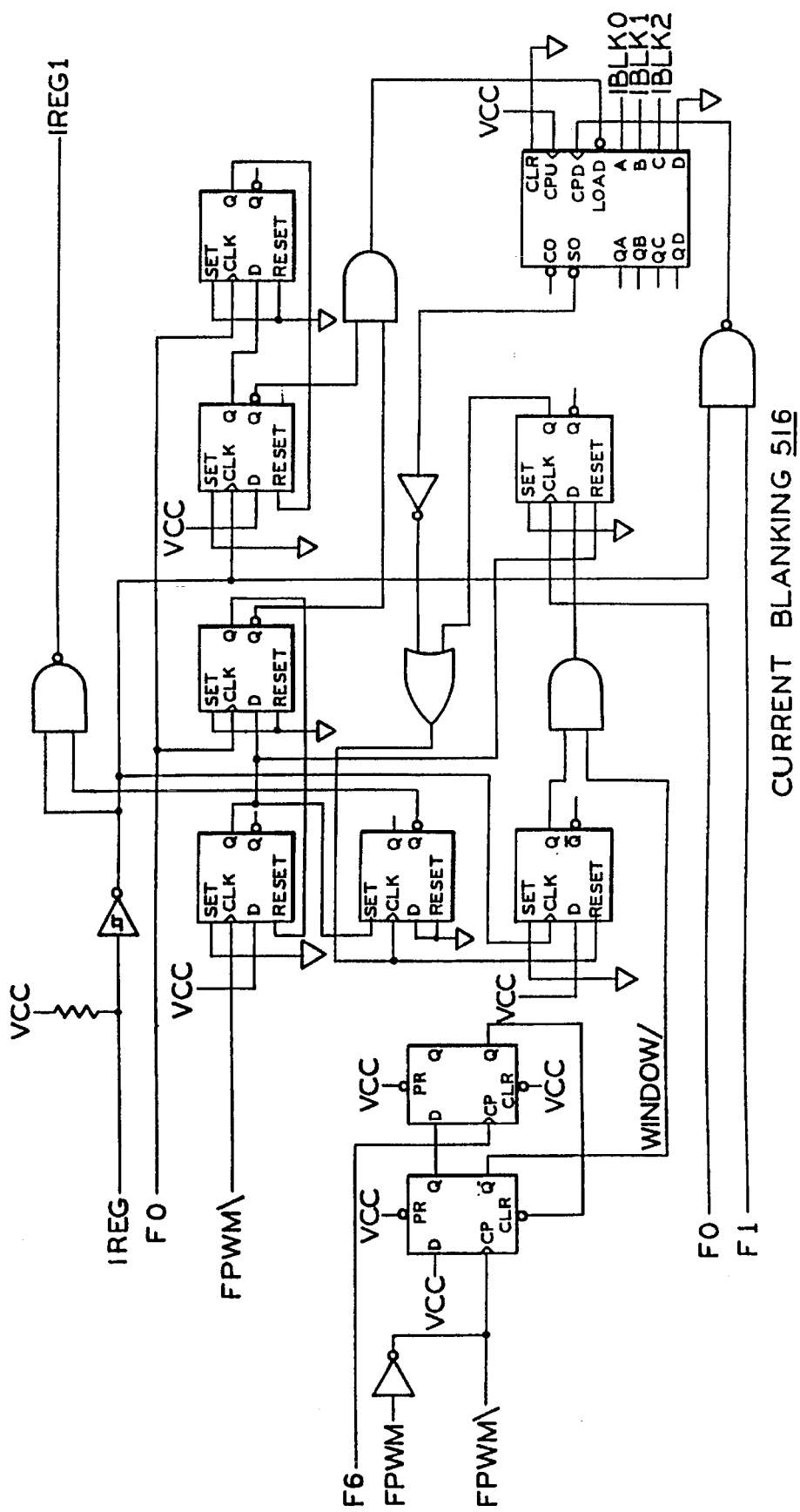
FIG_21

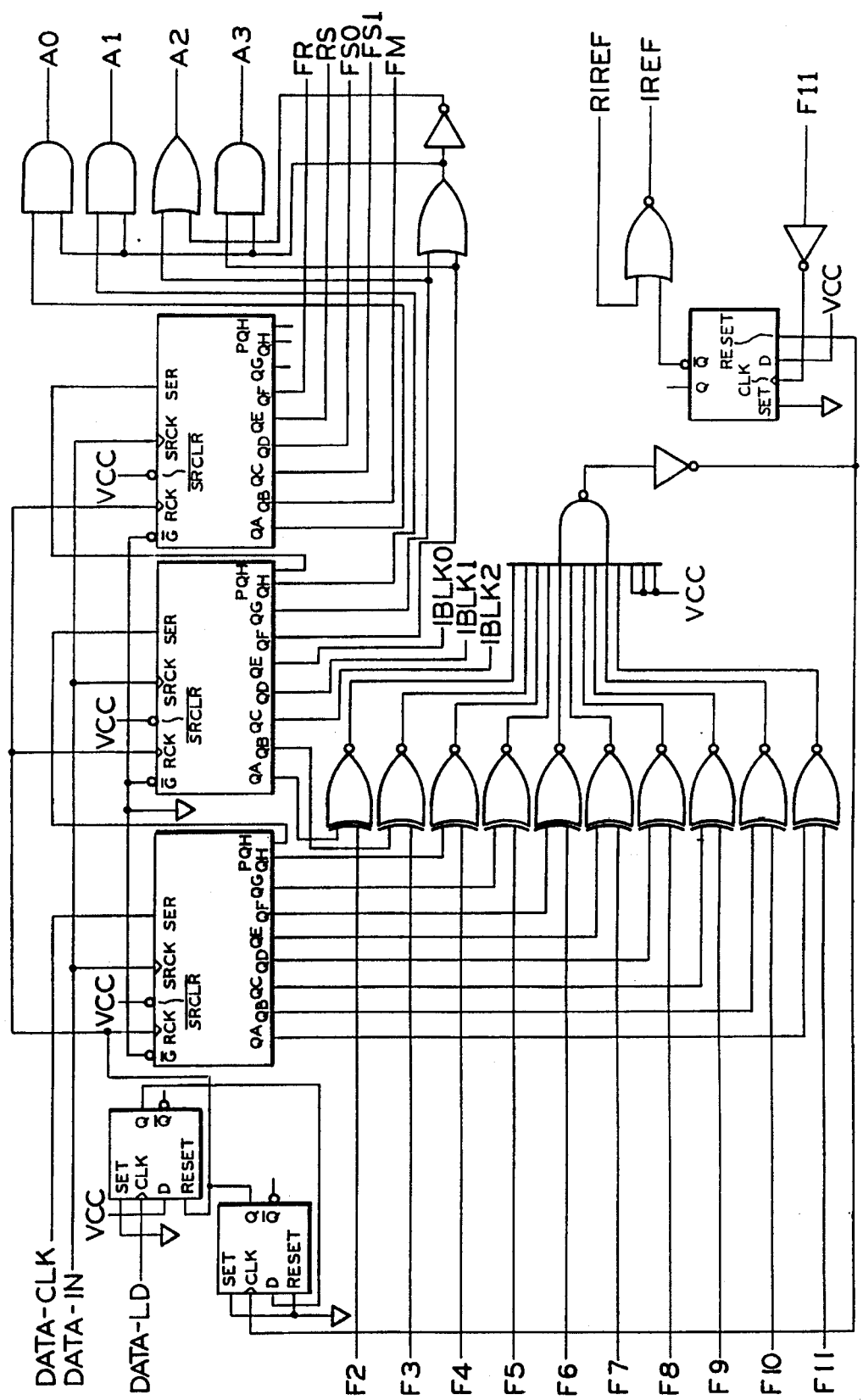
FIG. 22  SERIAL LOAD AND CURRENT REFERENCE (IREF) 510

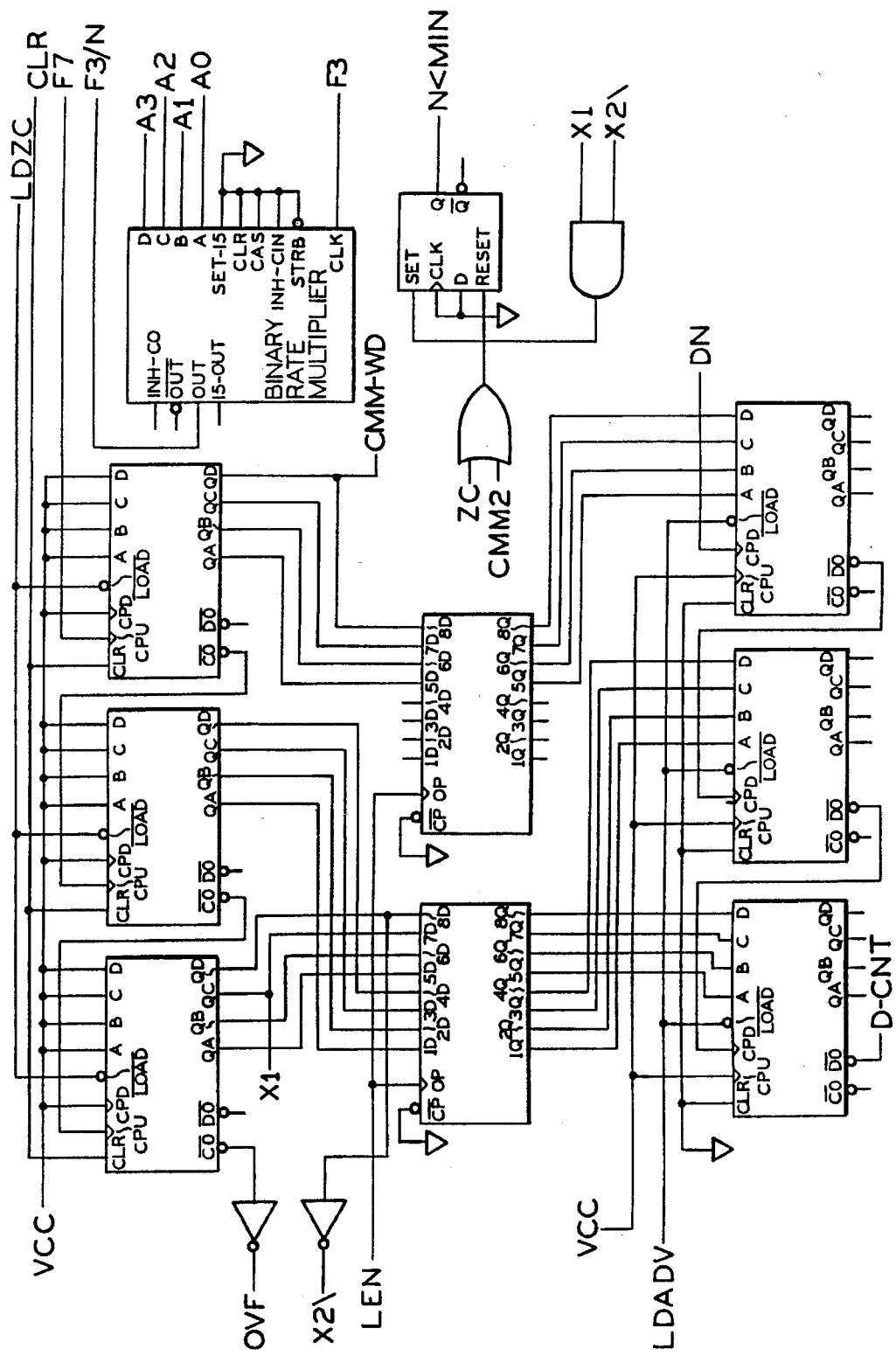
FIG_23
ZERO CROSS COUNTERS ADV&BLK COUNTERS AND UNDERSPEED SIGNAL

MICROCONTROLLER WATCH DOG 507

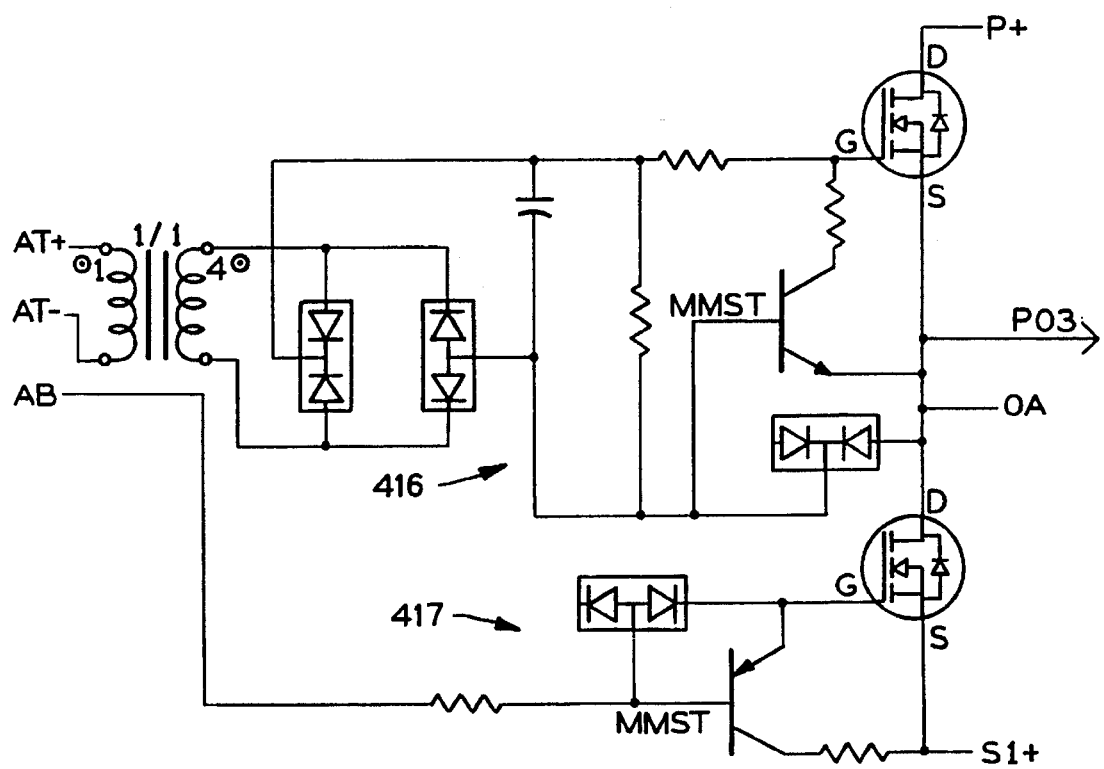
DRIVE PHASE LEG & GATE DRIVE CIRCUIT
FIG_26

5,492,273

HEATING VENTILATING AND/OR AIR CONDITIONING SYSTEM HAVING A VARIABLE SPEED INDOOR BLOWER MOTOR

CROSS-REFERENCE TO RELATED APPLICATION

This application is a continuation of Ser. No. 08/029,152, now abandoned which is a continuation-in-part of the commonly assigned application Ser. No. 07/889,708 filed May 27, 1992, the entire disclosure of which is incorporated herein by reference.

BACKGROUND OF THE INVENTION

This invention generally relates to electronically controlled motors and to systems, such as heating, ventilating and/or air conditioning systems having motors therein for driving indoor blowers.

Air flow in the indoor section of a heating, ventilating and/or air conditioning (HVAC) system generally determines several key performance characteristics of such a system. For example, in the air conditioning mode, the rate of air flow affects: 1) total system capacity for cooling and dehumidification; 2) latent system capacity for dehumidification; 3) overall efficiency (capacity/input power); and 4) indoor sound level. Variations in the rate of air flow, though cause these performance characteristics to vary differently.

In general, total heating of air conditioning capacity of a system increases as the indoor air flow rate increases. However, upon reaching a particular air flow rate, the blown air will be less warm or less cool, depending on the mode of the HVAC system, than the air in the room. For air conditioning systems, the indoor coil, or evaporator, tends to "saturate". In other words, the coil extracts incrementally less energy from the air for equal incremental changes in air flow. Further, the electric power consumed by the indoor blower motor increases rapidly as the air flow rate increases. The system dissipates electric energy as heat in the same air that is being cooled by the system thereby reducing its net cooling capacity. Due to the effects of coil saturation and blower motor power consumption, net total capacity peaks at a certain air flow rate.

The latent capacity of a system is its ability to remove moisture from the air. Generally, the evaporator coil becomes warmer thereby diminishing its ability to condense moisture as the air flow rate increases. Therefore, latent capacity of the system decreases as air flow rate increases.

A measure of the efficiency of a typical system may be defined by the total capacity divided by the total input power consumed by the system's components, e.g., the indoor blower motor, the compressor and the condensor fan motor. The power drawn by the indoor blower motor increases by the cube of the change in indoor air flow rate. Also, an increase in the air flow rate beyond what is required warms the evaporator coil to produce a higher load on the compressor motor. Thus, increasing air flow increases total power at a growing rate but increases total capacity at a diminishing rate. Efficiency peaks at a certain air flow rate which is less than the air flow rate corresponding to maximum total capacity.

Another concern for HVAC systems is the level of noise in the system. Indoor sound levels are directly related to the rate of air flow. Therefore, minimizing air flow rate minimizes the level of noise in the system.

For these reasons, maximum total capacity of a given system is achieved at a higher rate of indoor air flow than the rate at which maximum efficiency, dehumidification and sound levels are achieved.

Conventional systems, however, provide only a single air flow rate for cooling and another for heating. The indoor blowers are typically driven by discrete speed induction motors. Even in systems having a multispeed induction motor, the installer selects one of the speed taps to operate the motor at single speeds for cooling or heating. In any case, speed changes in an induction motor detrimentally affect system efficiency. More advanced HVAC systems may provide variable speed motors but require a separate controller, such as a humidistat, to switch motor speed.

Since conventional HVAC systems are ill-suited to speed variations, they often lack the necessary total capacity to maintain a desired indoor temperature, as commanded by the thermostat, when the outdoor temperature is extreme. In these cases, the system must operate continuously for prolonged periods of time. When the outdoor temperature is more moderate, though, the system capacity is typically greater than that needed to meet the demand.

Another disadvantage with conventional HVAC systems is that they cycle on and off in response to signals from a thermostat to maintain a set temperature in a conditioned space. However, on and off cycles are generally detrimental to system efficiency. For example, some heat may be transferred to the indoor coil of an air conditioner which remains cold from the preceding on cycle. Conventional systems attempt to recover this residual capacity by delaying turning off the indoor blower fan after the compressor cycles off. However, the system also continues to draw power at the same level as during the cycle and causes additional energy to be consumed in the indoor fan motor. Some conventional systems reduce the air flow rate after the system has cycled off but continue to operate for the duration of the off cycle, also consuming power unnecessarily.

SUMMARY OF THE INVENTION

Among the several objects of this invention may be noted the provision of an improved central heating, ventilation and/or air conditioning system permitting optimum air flow for maximum comfort and/or efficiency for varied system environments; the provision of such a system which permits controlling the air flow rate of the system by controlling speed or torque of a motor driving an indoor blower; the provision of such a system which permits operating the motor at more than one speed; the provision of such a system which permits maximizing total capacity of the system; the provision of such a system which permits maximizing overall efficiency of the system; the provision of such a system which permits improving latent capacity of the system; the provision of such a system which permits boosting air flow to a rate greater than the rate corresponding to the normal operating speed or torque of the motor for maximizing total system capacity; the provision of such a system which permits reducing air flow for a period of time to a rate less than the rate corresponding to the normal operating speed or torque of the motor for optimizing efficiency by recovering residual heating or cooling capacity; the provision of such a system which permits controlling speed or torque of the motor in response to a system control signal; the provision of such a system which permits delaying operation of the motor at the normal operating speed or torque for a period of time while the system warms or cools to the desired temperature; the provision of such a system which permits operating the motor at another speed or torque less than the normal operating speed or torque of the motor while the system components warm or cool to a desired temperature; the provision of such a system which is economically feasible and commercially practical.

Briefly described, a system of the present invention drives an indoor blower of a heating, ventilating, and/or air conditioning (HVAC) system in response to a system control signal. The system control signal has a BLOWER DEMAND state and a BLOWER END DEMAND state. The system comprises a motor having a stationary assembly and a rotatable assembly. The rotatable assembly is in magnetic coupling relation to the stationary assembly and in driving relation to the indoor blower. The system controls speed or torque of the motor in response to the system control signal thereby controlling the rate of air flow of the HVAC system. The motor operates at a first speed or torque in response to the BLOWER DEMAND state of the system control signal and operates at a second speed or torque less than the first speed or torque for a period of time in response to the BLOWER END DEMAND state of the system control signal.

Alternatively, a system of the present invention drives an indoor blower of an HVAC system in response to a system control signal. The system control signal has a BLOWER DEMAND state and a BLOWER END DEMAND state. The system comprises a motor having a stationary assembly and a rotatable assembly. The rotatable assembly is in magnetic coupling relation to the stationary assembly and in driving relation to the indoor blower. The system controls speed or torque of the motor in response to the system control signal thereby controlling the rate of air flow of the HVAC system. The motor operates at a first speed or torque in response to the BLOWER DEMAND state of the system control signal and operates at a second speed or torque greater than the first speed or torque when the BLOWER DEMAND state has been present for a period of time.

Alternatively, the invention may comprise various other systems and methods.

Other objects and features will be in part apparent and in part pointed out hereinafter.

BRIEF DESCRIPTION OF THE DRAWINGS

FIG. 2 is a partial schematic diagram of one preferred embodiment of a parameter control signal interface and various parameter control signals of the invention generated by the interface.

FIG. 3 is a partial schematic diagram of one preferred embodiment of the system control signal interface.

FIG. 5 is a block diagram of one preferred embodiment of an application specific IC (ASIC) of the invention.

FIG. 6 is a block diagram of one preferred embodiment of the current blanking circuit of the ASIC shown in FIG. 5.

FIG. 7 is a block diagram of one preferred embodiment of the reference current circuit of the ASIC shown in FIG. 5.

FIG. 8 is a schematic diagram of one preferred embodiment of the pseudo-random pulse width modulation frequency generator of the ASIC shown in FIG. 5.

FIGS. 11a–11d are timing diagrams illustrating one preferred embodiment of a preferred commutation strategy relating to zero crossings and blanking.

FIGS. 13A–13B illustrate one preferred embodiment of a schematic diagram of the commutation logic circuit and back EMF decoder of the ASIC of FIG. 5.

FIG. 14 is a schematic diagram of one preferred embodiment of an undervoltage detector of the ASIC of FIG. 5.

FIG. 15 is a schematic diagram of one preferred embodiment of the level shifters of the ASIC of FIG. 5.

FIG. 16 is a schematic diagram of one preferred embodiment of the pseudo random PWM frequency generator and clock management of the ASIC of FIG. 5.

FIG. 17 is a schematic diagram of one preferred embodiment of the PWM frequency selector of the ASIC of FIG. 5.

FIG. 18 is a schematic diagram of one preferred embodiment of the position sensing back EMF multiplexer of the ASIC of FIG. 5.

FIG. 19 is a schematic diagram of one preferred embodiment of the drive watch dog circuit of the ASIC of FIG. 5.

FIG. 20 is a schematic diagram of one preferred embodiment of the current regulation circuit of the ASIC of FIG. 5.

FIG. 21 is a schematic diagram of one preferred embodiment of the current blanking circuit of the ASIC of FIG. 5.

FIG. 22 is a schematic diagram of one preferred embodiment of the current reference generating circuit of the ASIC of FIG. 5.

FIG. 23 is a schematic diagram of one preferred embodiment of the zero crossing counters, the commutation and blanking counters and the underspeed detector circuit of the ASIC of FIG. 5.

FIG. 26 is a schematic diagram of one preferred embodiment of the gate drives to the power switches of FIG. 1.

Corresponding reference characters indicate corresponding parts throughout the drawings.

DETAILED DESCRIPTION OF THE PREFERRED EMBODIMENTS

Figure 1:
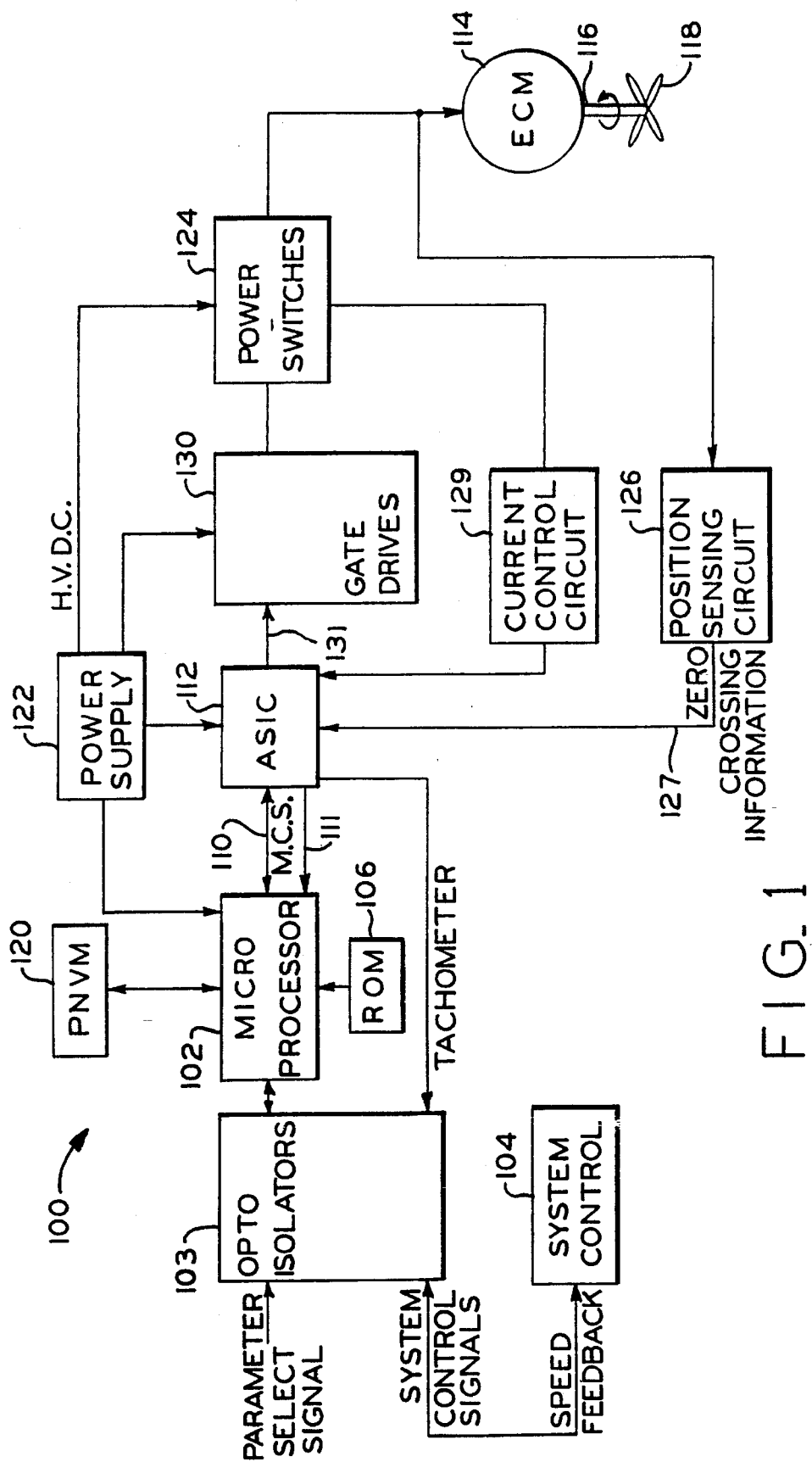
FIG. 1 is a block diagram of one preferred embodiment of an ECM drive system of the invention and including an application specific integrated circuit (ASIC).

Referring to FIG. 1, a system 100, one preferred embodiment of the present invention, which is part of an indoor unit (not shown) of a heating, ventilating or air conditioning (HVAC) system for moving air is illustrated. System 100 includes a microprocessor 102 for receiving via optical isolators 103 a temperature signal and/or other system control signals generated by a system control 104. A read only memory (ROM) 106 having software is used to control the operation of the microprocessor 102. ROM 106 may be incorporated with microprocessor 102 embodied as a microcontroller. Microprocessor 102 provides a set of motor control signals (M.C.S.) via line 110 to an application specific integrated circuit (ASIC) 112 or universal electronically commutated motor integrated circuit (UECM IC, not shown) for electronically controlling a plurality of gate drives 130 (see FIG. 26). The ASIC 112 provides information to microprocessor 102 via line 111. The ASIC 112 provides level shifted gate drive signals via line 131 which have been shifted from 5 volts to 10 volts in order to provide enough voltage to switch a plurality of power switches 124 (see FIG. 26). The power switches 124 are use to control a motor such as a variable speed induction motor, a switched reluctance motor or an electronically commutated motor (ECM) 114. For example, speed or torque of the motor may be controlled by controlling the power delivered to the load in order to control an air flow rate of an HVAC which includes the system 100. Electronically commutated motor (ECM) 114 has a rotatable assembly (not shown), or rotor, mechanically connected via a shaft 116 to a particular device to be driven, such as a blower, a compressor or a draft inducer (not shown) or a fan 118.

In addition, a programmable, non-volatile (PNV) memory 120 may be provided for storing various system parameters, as will be described below in greater detail, which parameters are used by the microprocessor 102 to determine operation of motor 114. PNV memory 120 may be an electrically erasable programmable read only memory (EEPROM). System 100 also includes a power supply 122 which provides power to operate the microprocessor 102 and ASIC 112 which drives the associated power switches 124. Power supply 122 also provides high voltage d.c. (H.V.D.C.) to the power switches 124 for driving the windings of the electronically commutated motor 114.

Motor 114 may include means for sensing the position of its rotatable assembly such as a position sensing circuit 126 for sensing a back electromotive force (BEMF) and which provides a zero crossing detector signal via line 127 to which ASIC 112 is responsive. A BEMF sensing circuit 126A (see FIG. 4) includes a sensing network and comparators. Microprocessor 102 may also include an internal analog-to-digital converter (not shown) for converting incoming analog signals into digital signals for further processing.

The ASIC 112 also responds to a current control circuit 129 for detecting overcurrent conditions in the windings of motor 114. The system of the invention includes two overcurrent detecting circuits 129A (see FIG. 4), both of which provide signals to the ASIC 112, to provide redundant overcurrent information. A current blanking scheme in ASIC 112 differentiates between an actual overcurrent signal and a false one caused by noise in the circuit. In the event of an overcurrent condition, the ASIC 112 removes the power applied to the motor 114 by turning off the gate drive signals. Current control circuit 129 also includes a current regulator 129B (see FIG. 4) providing a regulation signal (IREG) to ASIC 112. The current control circuit 129 as well as the internal overcurrent protection of the ASIC will be described in greater detail below.

The microprocessor 102 may be associated with programmable nonvolatile (PNV) memory 120 storing parameters representative of the system such as time constants which are a function of the thermal mass of the structure being heated and/or cooled by the indoor unit of the HVAC. Alternatively, PNV memory 120 may store parameters representative of the system characteristics. The microprocessor 102 may by connected via optoisolators 103 to a keypad or dip switches (not shown) responsive to operator input for providing a parameter select signal by selecting at least one of the stored parameters. The microprocessor 102 generates motor control signals (M.C.S.) via line 110 based on the parameters stored in memory 120 and in response to the parameter select signals thereby controlling the system 100. Alternatively, it is contemplated that the PNV memory 120 may include a parameter stored therein which is representative of the rotor magnetization level of the rotatable assembly. As a result, the motor control signals generated by the microprocessor 102 would be a function of the stored parameter in addition to the control signal parameters.

The system 100 may also be responsive to a mode signal provided to the microprocessor 102 via optoisolators 103 as a system control signal. For example, the mode signal may determine whether system 100 operates in a thermostat mode or in a variable speed mode. A PWM mode signal indicates variable speed or torque operation of the motor with the duty cycle of the mode signal corresponding to the desired motor speed or torque. In this configuration, microprocessor 102 detecting system control signals via optoisolators 103 would constitute means for detecting as a system control signal a mode signal having a particular form and means for selecting parameters for use by the control signal generating means in response to the detected mode signal.

FIG. 1 illustrates system 100 according to the invention for conditioning air in a space by moving the air or by heating or cooling the air to change its temperature. System control 104, such as a conventional thermostat, constitutes means for generating a system control signal such as a temperature signal corresponding to the temperature of the air space as it rises and falls. This system control signal is provided to microprocessor 102 via optical isolators 103.

For example, the EEPROM may have one or more of the following parameters stored therein: speed or air flow rate for various operating modes such as a heating mode and a cooling mode; speed or air flow rates for different system capacities such as tons of cooling and kilowatts of heating; parameters defining turn-on and turn-off time delays; parameters defining motor speed or torque changes over time; parameters defining the relationship between motor torque and air flow; parameters defining the relationship between motor speed and air flow; and parameters defining direction of rotation; and wherein the control signals generated by the microprocessor are a function of at least one of the stored parameters. Alternatively, the EEPROM may include a parameter stored therein which is representative of a difference between the actual power input into the system and the expected nominal power so that the control signals generated by the microprocessor 102 are a function of the difference.

As shown in FIG. 1, system 100 constitutes variable speed motor 114 which has a rotatable assembly, or rotor, in driving relation to the component such as fan 118. System 100 is responsive to the system control signal and has programmable nonvolatile (PNV) memory 120 which stores parameters representative of system 100. The motor control signal provided by microprocessor 102 to ASIC 112 via line 110 is responsive to at least one of the stored parameters plus the parameters selected in response to the parameter select signal and to the system control signal. System 100 provides the M.C.S. to ECM 114 to control its speed or torque. ROM 106 stores instructions which control the operation of microprocessor 102. The microprocessor 102 constitutes means responsive to the system control signals provided via optical isolators 103 by system control 104. The microprocessor 102 receives the system control signals, such as the temperature signal and monitors it to generate the motor control signal provided via line 110 as a function of the system control signal and the parameter select signal as well as any stored parameters.

Various time constants may be stored in PNV memory 120 which correspond to various parameters of various environments. Microprocessor 102 may be programmed at the factory or during field installation to select time constants corresponding to the environments within which the indoor unit including system 100 is being installed. The stored parameters may correspond to a constant CFM calibration, i.e., representative of a calibrated operation of the ECM 114 driving a predetermined, known load so that microprocessor 102 would be accurately responsive to the stored parameters.

As part of the process of manufacture, system 100 is operated with a known calibration load with a predetermined current versus speed characteristic. This load, for example, could be an ECM driving a blower wheel with a known restriction to the flow of air. It could also be an artificial load which electronically simulates the loading characteristics and waveforms present at the terminals of motor 114. The system 100 is calibrated by running it on this calibration load and commanding it to deliver, in sequence, one or more current levels to the load. For example, it may first be commanded to provide the full or maximum current level and then a relatively low current level. In each case, the actual current delivered by the system 100 is measured either directly or indirectly by measuring the speed achieved on the calibration load. Due to circuit tolerances within the particular system 100, the actual current values may be somewhat different from the correct or nominal values. This actual information generates a current offset factor and a multiplier factor compensating for the inaccuracies within the system 100. The compensation factors are stored permanently in the PNV memory 120. In this manner, the system 100 is calibrated to compensate for the tolerance variations of its internal components.

Alternatively, the parameters may be representative of a calibrated operation of ECM 114 driving no load so that the microprocessor 102 is accurately responsive to such stored parameters. In the case of ECM 114, an alternate simplified method of calibration may be used. The system 100 is run at no load and the no load speed is measured. No load speed is a very good indicator of rotor magnetization level which is the predominant cause of torque variations. Storing this information along with the previously obtained control calibration information in an EEPROM used as PNV memory 120 allows subsequent compensation for most of such tolerance variations. No load motor tests are much less time consuming than load tests and do not require a dynamometer. As such, they are routinely performed anywhere. The built-in microprocessor 102 in the control can by itself measure the no load speed and store the data in the PNV memory 120, requiring minimal external equipment.

Alternatively, the parameters stored in PNV memory 120 may be representative of an operation of a particular motor 114 in combination with a particular system 100 to provide a representative operation of particular motor 114. For example, the stored parameters may represent the difference between the actual torque generated by a particular motor 114 and the nominal values thereby representing the combined inaccuracies of the particular motor 114 in combination with the microprocessor 102. In a number of applications, the system 100 and the motor 114 are physically attached together and distributed as a single unit. In such cases, the system 100 would be programmed with not only its own inaccuracies but also those of the motor 114 to which it is attached.

Generally, the system 100 without motor 114 is first calibrated by one of the methods described above. The calibrated system is then connected to the motor 114. The system and motor combination are then calibrated, for example, by running them on a loading/measuring device such as a dynamometer. Certain torque level(s) are commanded of the system 100 and motor 114 and the resulting actual torques are measured. The difference between the actual torques and the correct or nominal values represents the combined inaccuracy of the system and the motor. This information is stored in the PNV memory 120 to enable the microprocessor 102 to produce near-nominal torque in the actual operation by compensating for the tolerance inaccuracies of both motor 114 and system 100.

This correlation between actual and nominal values may be extended beyond improvement of system and motor combination accuracy to calibration of variations in the target system. A typical application for variable speed motors is driving blower wheels in gas furnaces or indoor fan coil units of central heating and air conditioning systems. The key performance parameter is blower air flow which depends on motor speed-torque characteristics, restriction level (static pressure) in an installation, and physical characteristics of the blower wheel such as blade pitch, etc. Methods have been previously devised to generally compensate for the static pressure variations, making the air flow somewhat independent of installation. However, to achieve the best air flow accuracy, unit to unit variations due to blower wheel characteristics need to be calibrated out. This can be accomplished in the following manner. A calibrated system and motor combination is installed in the particular blower wheel of a furnace or fan coil unit. The inlet and outlet openings of the unit are kept at a predetermined level, including completely open, thus, ensuring a known restriction level. Operation of the motor 114 with a certain system control signal provided to the control should then result in a predictable nominal blower speed or power. The actual blower speed or power is measured and its deviation from nominal represents the inaccuracy of the blower wheel. This information is stored in the PNV memory 120 so that microprocessor 102 can compensate in actual operation.

In one preferred embodiment, memory 120 comprises an EEPROM having one or more of the following parameters stored therein: speed or air flow rate for various operating modes such as a heating mode and a cooling mode; speed or air flow rates for different system capacities such as tons of cooling or kilowatts of heating; parameters defining turn-on and turn-off time delays; and parameters defining direction of rotation. Each parameter may also differ depending on the mode of operation. For example, the following modes may be used: heat pump, backup heat, emergency heating, dehumidifier, fan only, or other modes. As a result, the motor control signals generated by microprocessor 102 and provided via line 110 would be a function of at least one or more of the stored parameters.

As noted above, it is also contemplated that the memory 120 may include a correction factor (such as a current offset or a multiplier) for tolerance inaccuracies of the any one or more portions of the system. For example, the memory 120 may include a parameter stored therein which is representative of the difference between the actual current being delivered to the motor 114 and the expected nominal current. As a result, the motor control signals provided by microprocessor 102 via line 110 would be a function of this stored correction factor parameter.

The parameters stored in the memory may also be representative of the difference between the actual speed of the component being driven by the motor or the actual power input (watts) into the motor 114 and the expected nominal speed or input power so that the motor control signal generated by the microprocessor 102 would be a function of this stored parameter.

In accordance with one feature of the invention, FIG. 2 illustrates means for providing parameter select signals to the microprocessor 102. The ECM 114 of the system 100 may be configured for driving fans, such as fan 118, for a variety of HVAC system having different heat pump capacities and backup heat ratings. Further, the fans may operate in a variety of modes such as cooling, dehumidification, fan only, heating and the like. The ECM 114 can provide optimum air flow in each case for maximum comfort and/or efficiency. In accordance with the present invention, the microprocessor 102 controls the ECM 114 in response to selected parameters corresponding to a set of operating parameters selected at installation in the field including fan speed, compressor speed, heat output and the like. Selecting the parameters is referred to as the field selection process.

In a preferred embodiment, the system 100 directly interfaces the microprocessor 102 with parameter select signals by diode duplexing. As shown in FIG. 2, a 24 volt alternating current (24 VAC) supply voltage 200 is applied to a positively biased diode 202 which rectifies the AC voltage and provides a positive half wave output signal 204. A negatively biased diode 206 similarly rectifies the 24 VAC signal and provides a negative half wave output signal 208.

The rectified half wave signals are selectively connected to the microprocessor 102 through optical isolators 103 as parameter select signals as either the full cycle 24 VAC supply voltage 200, the positive half wave output signal 204, the negative half wave output signal 208 or no signal is interfaced with the microprocessor 102. Thus, field selection consists of connecting each of four of the optical isolators 103 to one of four field select lines 210, 212, 214, 216 to provide one of the above four signals as an input to microprocessor 102 via the optical isolators 103. This is equivalent to having four selection switches, each with four positions.

The PNV memory 120 stores at a particular address a set of operating parameters for the system 100 corresponding to a defined air flow rate. The microprocessor 102 reads the particular address in the PNV memory 120 corresponding to the air flow rate selected by the parameter select signals. The operating parameters stored at the particular address are used by the microprocessor 102 to control fan speed in response to compressor speed and desired heat output. Microprocessor 102, thus, calculates appropriate air flow rates for given configurations of system 100 from the parameter select signals.

FIG. 3 shows a preferred embodiment of circuit for providing the system control signals to microprocessor 102 according to the present invention. The microprocessor 102 controls the ECM 114 in response to a number of system control signals provided by system control 104 such as a temperature signal provided by a thermostat. Other system control signals include a blower activating command, an electric heat command, first and second stage compressor commands, a reversing valve command and a humidistat low humidity signal. The microprocessor 102 defines an operating mode for the ECM 114 in response to the system control signal. The ASIC 112 executes system control commands. In one embodiment, the ECM 114 can respond to six 24 volt AC signals. Six system interface lines (not shown) may be connected directly to a low voltage terminal board (not shown) of the indoor unit. A variation of the "diode duplexing" concept used in field selection is implemented with the ECM 114 for providing the system control signals to the microprocessor 102.

A number of diodes, such as diodes 301 and 303 are configured in bipolar diode pairs, such as pair 304, as shown in FIG. 3, and a low voltage alternating current (AC) supply voltage is selectively applied to the diodes 301 and 303. Each bipolar diode pair 304 provides a composite output signal from node 305 to the optical isolators 103, the output of which is directly presented to microprocessor 102. The composite output signal is a half wave signal only when either diode 301 or diode 303 of the pair 304 receives the AC supply voltage and is a full wave signal when both diodes 301 and 303 of the pair 304 receive the AC supply voltage.

An operator may selectively apply the AC reference voltage by mechanically opening or closing switches 307 and 309, such as in a thermostat, connected in series with diodes 301 and 303, respectively. Alternatively, switches 307, 309 may be electronically controlled by system control 104. Table 1 shows the composite output signal which would be provided to the microprocessor for different configurations of switches 307 and 309.

TABLE I

| 307 | 309 | COMPOSITE OUTPUT |
|---|---|---|
| Open | Open | No signal |
| Open | Closed | Negative Half-wave |
| Closed | Open | Positive Half-wave |
| Closed | Closed | Full Cycle |

Resistors 311 and 313 may be placed in series with diodes 301 and 303, respectively, to limit power dissipation by limiting current in diodes 301 and 303.

In another preferred embodiment, fan 118 is embodied as an indoor blower driven by motor 114 of system 100 according to the invention. System control 104 generates a system control signal having a BLOWER DEMAND state and a BLOWER END DEMAND state. The two states represent activation and deactivation commands, respectively, for fan 118. The system control states may be coordinated with or synchronous with a compressor cycle, or delayed, in accordance with a particular application of system 100. System 100 controls the speed or torque of motor 114 for controlling the indoor air flow rate of the HVAC system in response to the system control signals.

As described above, microprocessor 102 may be associated with PNV memory 120 storing parameters representative of the system such as time constants which are a function of the thermal mass of the structure being heated and/or cooled by the indoor unit of the HVAC. Microprocessor 102 generates motor control signals based on the parameters stored in memory 120 and in response to the system control signal thereby controlling system 100.

For example, PNV memory 120 may have one or more of the following parameters stored therein: air flow rates for various operating modes such as a heating mode and a cooling mode; air flow rates for different system capacities such as tons of cooling and kilowatts of heating; parameters defining turn-on and turn-off time delays; parameters defining periods of reduced air flow; parameters defining periods of increased air flow; parameters defining the relationship between motor torque and air flow; and parameters defining the relationship between motor speed and air flow.

Figure 27:
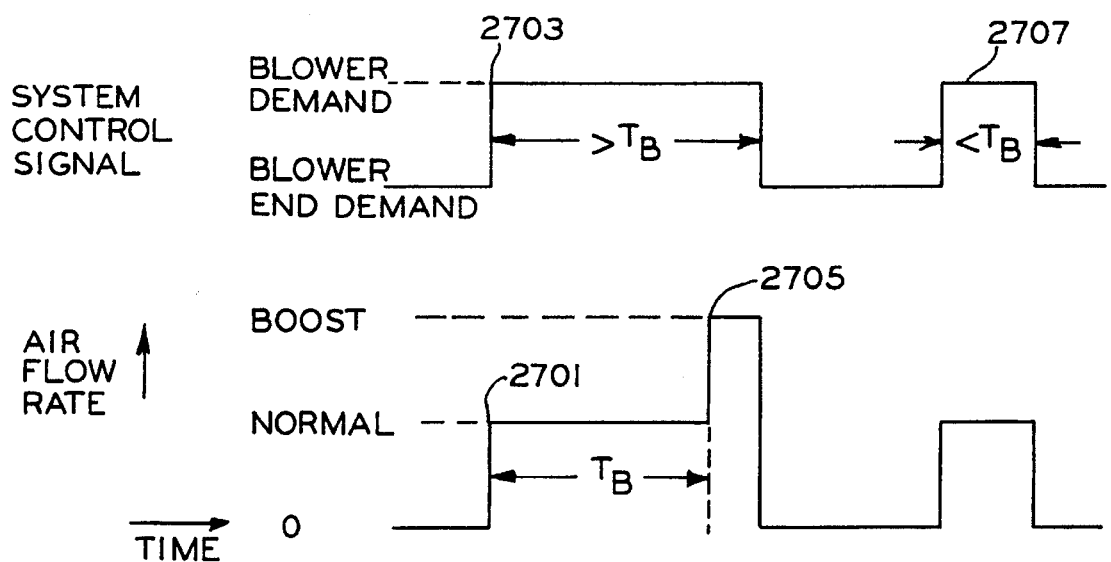
FIG. 27 is a timing diagram illustrating one preferred embodiment of an air flow rate boost after a blower demand signal has been present for a period of time.

In accordance with one feature of the invention, FIG. 27 illustrates a timing diagram of an air flow rate boost. As mentioned above, PNV memory 120 stores at a particular address a set of operating parameters for system 100 corresponding to a defined air flow rate and a length of time at which system 100 provides the defined air flow rate. Microprocessor 102 reads the particular address in PNV memory 120 corresponding to the air flow rate selected by the parameter select signals. The operating parameters stored at the particular address are used by microprocessor 102 to control the speed (or torque) of fan 118 in response to compressor speed and desired heat output.

As FIG. 27 illustrates, system controller 104, such as a thermostat, activates air conditioning demand to instruct motor 114 to operate at a speed or torque to drive fan 118 to deliver a defined air flow for a period of time $T_B$. In the case where the system control signal is a thermostat signal, it would have two states: an open-circuited or low state signifying no demand or a closed-circuited or high state signifying demand. The defined air flow rate, shown at reference character 2701, is responsive to a BLOWER DEMAND state, shown at reference character 2703. Motor 114 operates at the speed or torque so that system 100 delivers air at a normal operating air flow rate, depending on the characteristics of the system. Microprocessor 102, in response to the parameter select signals, selects an air flow rate which optimizes the efficiency and latent capacity of system 100 under moderate temperature conditions.

In a preferred embodiment, the BLOWER DEMAND state may initiate a cycle and activate a compressor as well as blower fan 118. As the system control signal reaches the BLOWER DEMAND state, air begins flowing at the normal operating rate. At the end of the period $T_B$, microprocessor 102 increases operation of system to a second air flow rate greater than the first air flow rate which increases operation of motor 114 to a second speed or torque which is greater than the normal operating speed or torque. In this manner, the air flow rate is boosted, as shown at reference character 2705, when a prolonged demand is present. System 100 only boosts the air flow rate if the system control signal remains in the BLOWER DEMAND state after the expiration of period $T_B$. Reference character 2707 refers to the system control signal being in the BLOWER DEMAND state for less than $T_B$. Period $T_B$ is predetermined such that system 100 should satisfy the thermostat demand within that period. Therefore, the air flow boost would not occur for steady state operation under moderate temperature conditions.

Figure 28:
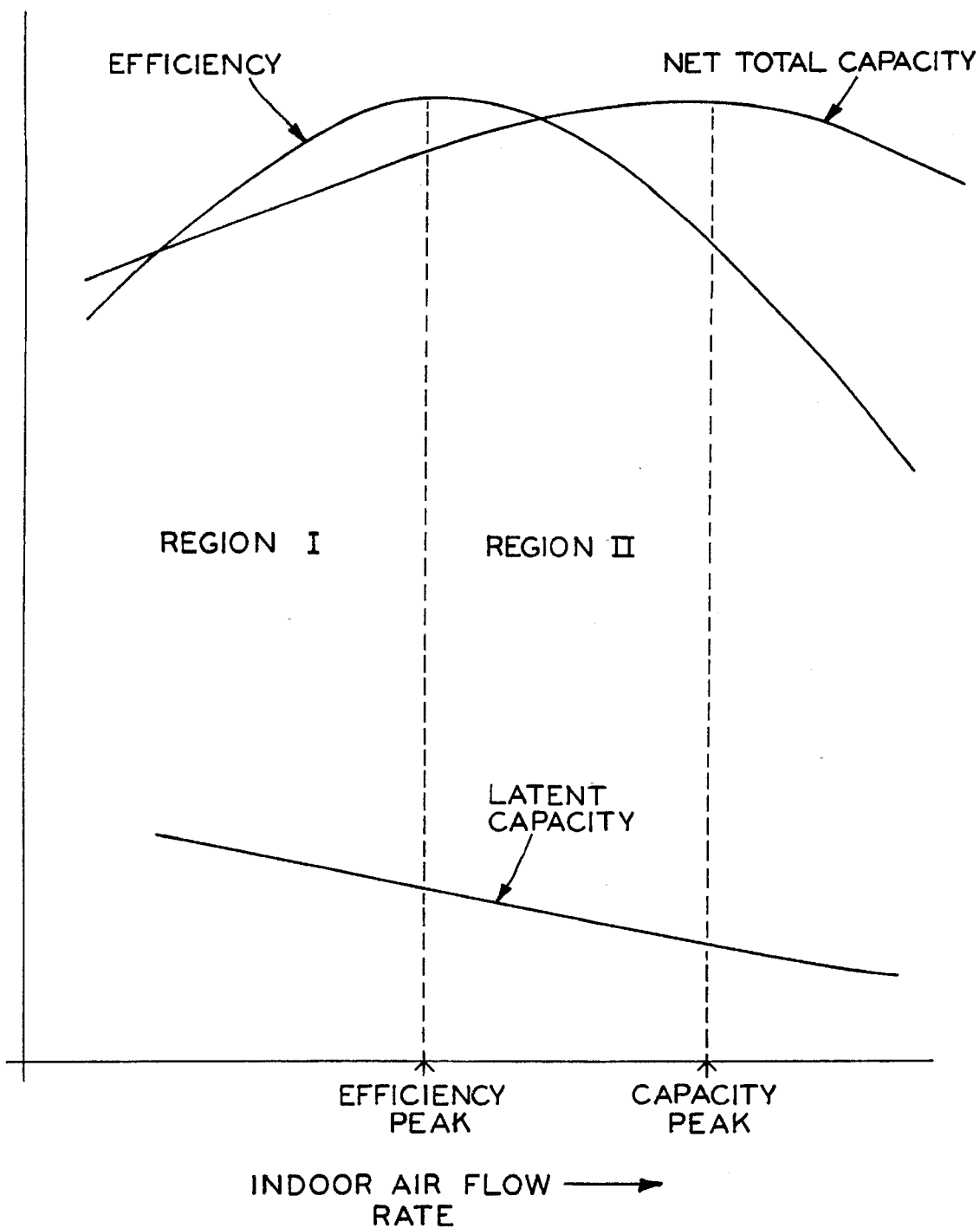
FIG. 28 is a diagram showing the relationship between air flow rates and efficiency, capacity and latent capacity according to the invention.

FIG. 28 illustrates changes in the system capacity, latent capacity and efficiency as the air flow rate increases. As shown, both system capacity and efficiency increase as indoor air flow increases. However, both of these performance characteristics peak at a particular air flow rate. System capacity is maximized at a higher rate than system efficiency. Latent capacity of the system decreases as the indoor air flow rate increases. The normal operating air flow rate, when employing the air flow boost feature of the invention is defined to be the rate at which efficiency peaks. The boost air flow rate is defined to be the rate at which capacity peaks.

Prolonged thermostat demand beyond period $T_B$ indicates the need for increased total capacity. Therefore, the second speed or torque at which motor 114 operates boosts air flow to the second air flow rate thereby maximizing capacity. The air flow boost rate may be implemented in a single step, as shown in FIG. 27, or several steps sequenced in time. Alternately a timed ramp between the two defined rates may be implemented. In a preferred embodiment, the period $T_B$ and the air flow boost are accomplished by circuits and/or microprocessor software internal to motor 114 of system 100. Alternately, an external controller may be employed to do the same. Thus, the present invention delivers maximum capacity only when it is needed while operating system 100 at its peak efficiency with improved latent capacity and lower sound levels in most situations. Further, system 100 employing the air flow boost feature provides acceptable dehumidification under most conditions without requiring a humidistat.

Alternately, system controller 104 may include a humidistat which signals whether or not the humidity level is acceptable. If the level of humidity is acceptable, system 100 boosts the air flow rate under prolonged demand circumstances. If the level of humidity is too high, system 100 a) reduces air flow to the normal operating air flow rate or to a rate less than the normal rate to maximize latent capacity; and/or b) extends the period $T_B$ until an acceptable humidity level is achieved.

Figure 29:
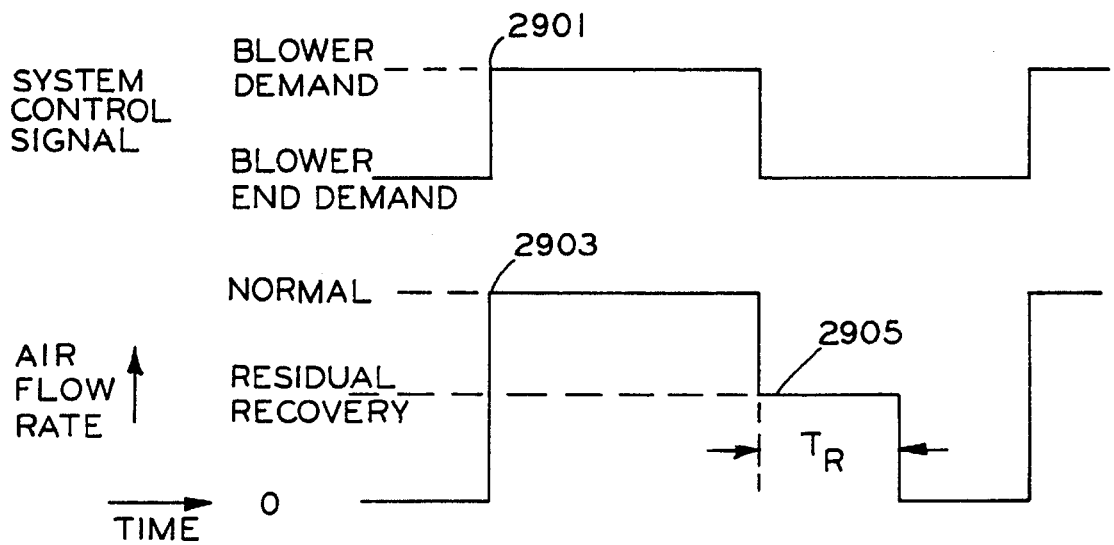
FIG. 29 is a timing diagram illustrating one preferred embodiment of a reduced air flow rate for recovery of residual energy after the end of a heating or cooling cycle.

Referring to FIG. 29, another feature of the present invention optimizes the recovery of residual capacity in the coils, ducts and the like of system 100. In response to the BLOWER DEMAND state of the system control signal, as shown at reference character 2901, motor 114 operates at a speed or torque to drive fan 118 to deliver a defined air flow rate, shown at reference character 2903. Motor 114 operates at the speed or torque so that system 100 delivers air at the normal operating air flow rate, depending on the characteristics of the system. Microprocessor 102, in response to the parameter select signals, selects this air flow rate to optimize the efficiency, capacity and latent capacity of system 100 under all temperature conditions. Referring again to FIG. 28, a normal operating air flow rate selected from Region II provides acceptable performance of system 100.

In a preferred embodiment, the BLOWER DEMAND state is synchronous with an activation command for a compressor cycling on and off. As the system control signal reaches the BLOWER DEMAND state, air begins flowing at the normal operating rate. If the system control signal is synchronous with the compressor cycle, the end of the on cycle coincides with the BLOWER END DEMAND state. In order to recover residual capacity remaining in the ducts or coils, for example, system 100 delays turn-off of the blower motor 114 for a period of time $T_R$. In this particular embodiment, the system operates at a second air flow rate which is less than the first air flow rate so that motor 114 operates at a second speed or torque which is less than the normal operating speed or torque in response to the BLOWER END DEMAND state of the system control signal. In this manner, system 100 reduces the air flow rate, as shown at reference character 2905, which likewise reduces the power drawn by the blower motor 114. For these reasons, microprocessor 102, in response to the parameter select signals, selects the air flow rate at 2905 and period $T_R$ for optimizing heat transfer during the off cycle of the compressor. Referring again to FIG. 28, the reduced air flow rate should be selected from Region I for providing optimum recovery of residual capacity.

As an example of the reduced air flow feature and delayed turn-off feature of the invention, the compressor turns on and off in response to thermostat demand with a 50% duty cycle over a 12 minute period (6 minutes on and 6 minutes off). Indoor blower fan 118 delivers 1200 CFM of air flow so that system 100 consumes 400 watts of power. With a typical standard fan delay, blower fan 118 remains on for 90 seconds after the compressor turns off, continuing to deliver 1200 CFM at 400 watts for a total on time of 7.5 minutes. Thus, the average power consumed by system 100 over the full 12 minute cycle is 400 W×7.5/12 or 250 watts. According to the present invention, system 100 reduces the air flow rate by half to 600 CFM during the turn-off delay period $T_R$. Period $T_R$ is doubled to 3 minutes. In general, other rates of reduced air flow and period extension may be used to optimize heat transfer during the off period for a given system. By the cubic fan law, half the air flow is delivered at one-eighth the power level at the shaft of motor 114. If the efficiency of motor 114 remains the same at the reduced air flow rate, then motor 114 input power also decreases by a factor of eight to 50 watts. In practice, the actual input power may be 60 watts. Therefore, the blower consumes 400 watts during the 6 minute on period and only 60 watts during the 3 minute delay period $T_R$. Thus, average power during the 12 minute cycle is 215 watts representing a significant improvement in overall system efficiency.

Alternately, the reduced air flow rate and delayed turn-off feature of the present invention may include a delayed turn-on or reduced air flow rate to allow system 100 to warm up, or cool down, before fan 118 delivers the normal air flow. Also, the above-described features of the invention may be combined to optimize system efficiency and capacity and to improve latent capacity as well as to recover any residual capacity.

Figure 4:
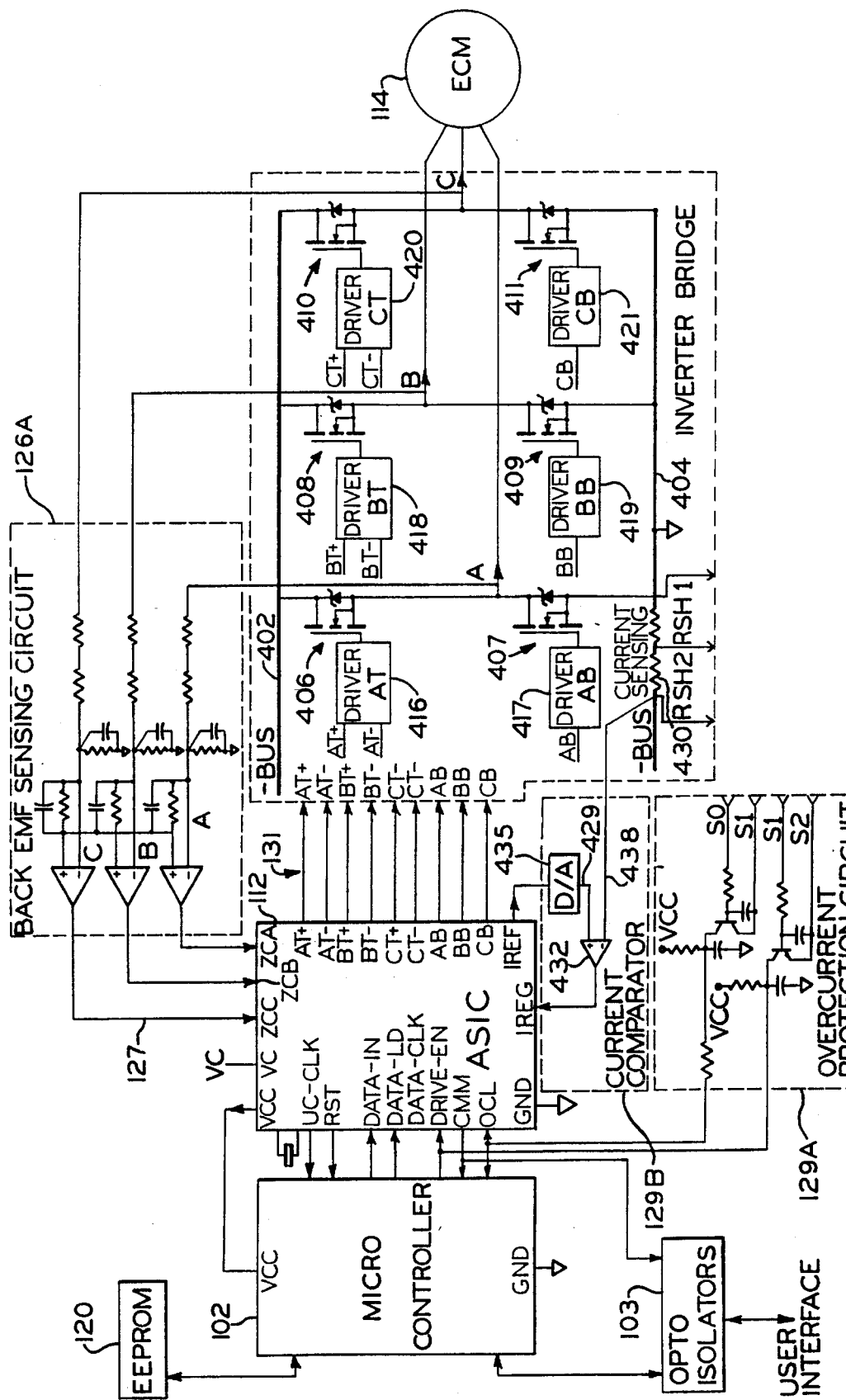
FIG. 4 is a schematic diagram of one preferred embodiment of portions of the block diagram of FIG. 1.

FIG. 4 shows a schematic of portions of the block diagram of FIG. 1. Microprocessor 102 receives via optical isolators 103 the system control and parameters select signals. PNV memory 120 stores various system parameters which are used by microprocessor 102 to determine operation of motor 114. In one preferred embodiment, power switches 124 are illustrated as an inverter bridge having a positive bus 402 and a negative bus 404 supplied by a power supply (not shown). Preferably, power switches 124 are activated in pairs; one switch is closed for each winding of motor 114 to be energized. Power switches 406 and 407 correspond to phase A. Power switches 408 and 409 correspond to phase B. Power switches 410 and 411 correspond to phase C. Power switches 406–411 are driven by drivers 416–421 (see FIG. 26), respectively, in response to drive signals provided by ASIC 112. The excitation scheme for ECM 114 involves three-phase excitation with trapezoidal current excitation. This may involve the use of a three-stage full-bridge inverter employing six switches, such as power switches 406–411, and a flyback diode coupled in an anti-parallel relationship with each switch of switches 406–411. In the preferred embodiment, the anti-parallel diodes (not shown) are included in switches 406–411. Two switches are commanded on during each motoring interval, one from the upper set of switches 406, 408, 410 and one from the lower set of switches 407, 409, 411. Current flows in only two of the three motor phases during each excitation interval.

As illustrated in FIG. 4, current control circuit 129 includes overcurrent protection circuit 129A, which provides input signals to both microprocessor 102 and ASIC 112, and current regulator 129B providing an IREG signal to ASIC 112 in response to a current reference signal (IREF) provided by ASIC 112 and a signal representing motor phase current sensed in a resistive shunt 430 having resistors Rsh1 and Rsh2 and providing outputs S0, S1 and S2. A back EMF sensing network 126A is part of position sensing network 126 shown in FIG. 1. The position sensing and current control features are described below.

The ASIC 112 also provides voltage signals shifted from 5 volts to 10 volts for driving the power switches 406–411. In the preferred embodiment illustrated, the plurality of gate drives 416–421 drive the gates of the power switches 406–411. Gate drives 416–421 condition the signals provided via line 131 from ASIC 112 for optimal operation of switches 406–411 by adjusting their switching speed.

Phase currents of the ECM 114 can be sensed using shunt resistors, current transformers, Hall-effect current sensors or other sensors or circuits. In the embodiment illustrated, a shunt resistor 430 is placed on the negative DC bus 404 which supplies the power switches 406–411. Referring to FIG. 4, motor phase currents are sensed by shunt resistor 430 and only flow through the resistor 430 when power is being exchanged from the supply 402 to motor 114 and vice versa. The shunt 430 does not detect circulating currents involving more than one motor phase.

Current in the windings of ECM 114 is compared to a reference current signal (IREF) provided by ASIC 112. The comparison results in a signal being input to ASIC 112 to execute current regulation. In a preferred embodiment, cycle-to-cycle current regulation is utilized by circuit 129B. Circuit 129B provides a frequency determined by the ASIC 112 during the current regulation cycle. Gate drives 416–421 energize two of the power switches 406–411, such as switches 416 and 419, at the beginning of a PWM cycle. This allows the current in the windings of motor 114 to increase until reaching a threshold value set by the reference current (IREF). At this instant, one or both of the power switches 416, 419, for example, are turned off causing motor phase current to decay. Such switches remain off until the beginning of the following PWM cycle, thus, completing one regulation cycle. In particular, ASIC 112 defines reference current (IREF) which is input via line 429 to a comparator 432. The reference current is first converted from a digital signal to an analog signal by a D/A converter 435. Comparator 432 compares the motor phase current sensed on the shunt 430 via line 438 with the analog of the reference current provided by line 429; the output of comparator 432 is logic level low when motor current exceeds reference current. Since motor torque is proportional to current, the ASIC 112 controls the torque of the motor 114 in response to the difference between the detected motor phase current and the reference current.

Referring to the block diagram of the ASIC 12 illustrated in FIG. 5, ASIC 112 controls the ECM 114 for air moving applications. ASIC 112, among other things, senses the rotor position of the ECM 114, controls torque by a motor phase current control and provides high level voltage gate drive signals to control power switching devices.

A master oscillator 502 (shown in more detail in FIG. 16) generates a clock signal which synchronizes the timing of the operation of the various portions of the ASIC 112. ASIC 112 provides the clock signal to microprocessor 102. Further, an interface between the ASIC 112 and the microprocessor 102 consists of several input/output data lines shown in the block diagram of FIG. 5. In the preferred embodiment, three input lines form a serial interface with ASIC 112. The interface provides serial communication to the ASIC 112 of a current reference signal (IREF), a direction of rotation command (FR), a blanking signal (IBLK) and a frequency selection signal (FS). Other signals include an angle advance (ADV), a fast/slow commutation PWM mode (FM) and an overcurrent reset signal (RS). Register 504 stores data serially loaded in the microprocessor 102.

Figure 24:
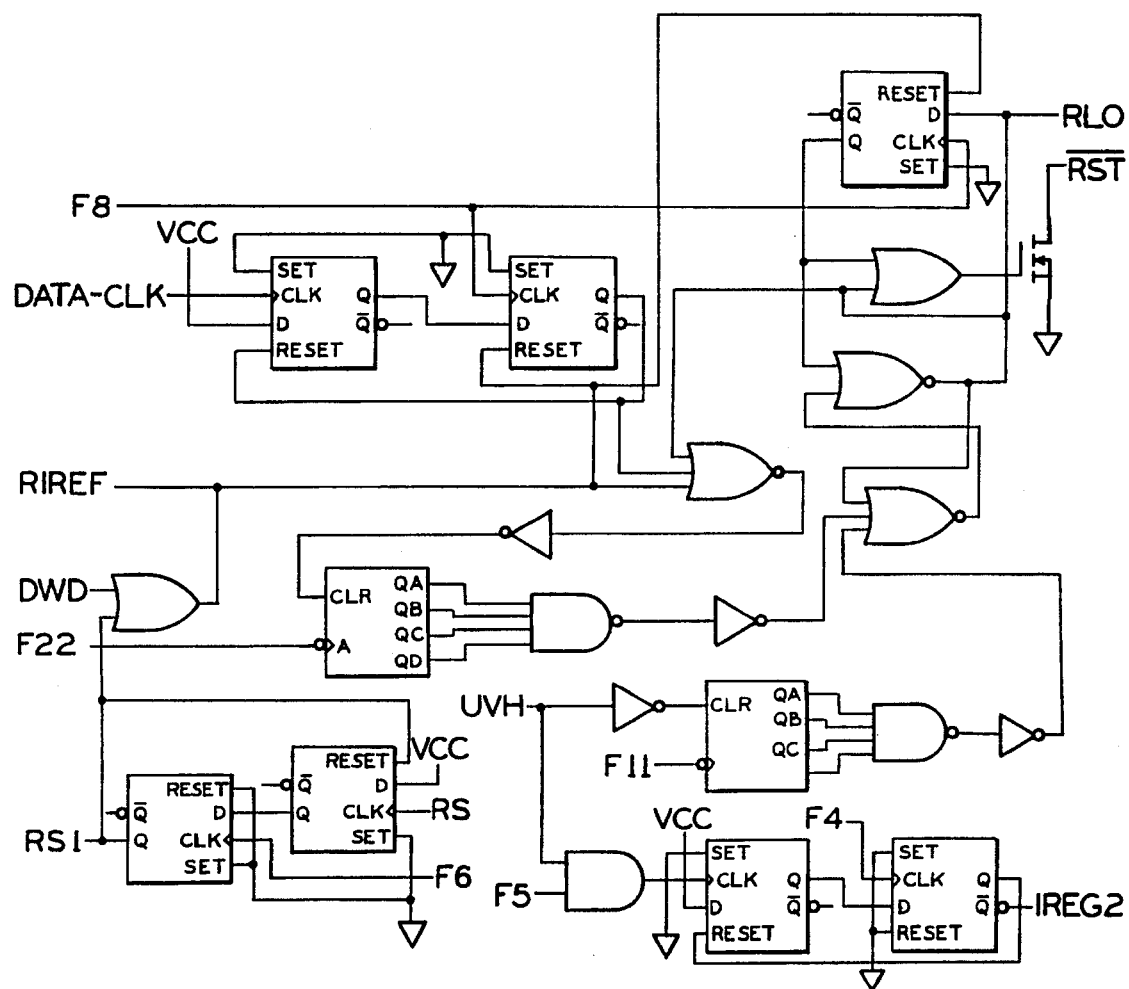
FIG. 24 is a schematic diagram of one preferred embodiment of the microcontroller watch dog circuit of the ASIC of FIG. 5.

The ASIC 112 also provides data to the microprocessor 102. The ASIC 112 resets microprocessor 102 when the clock signal (DATA-CLK) from the microprocessor 102 is absent for a predetermined interval of time. This is accomplished by a microcontroller watchdog circuit 507 (shown in more detail in FIG. 24). The ASIC 112 provides a reset signal to microprocessor 102 during system power up. Also, ASIC 112 provides an overcurrent latch output which can be read by microprocessor 102 to determine whether an overcurrent condition exists. ASIC 112 also provides a motor speed signal via line 554 to microprocessor 102.

ASIC 112 also includes various control circuits. A current reference circuit 510 (shown in more detail in FIG. 22) associated with the current reference signal (IREF) from microprocessor 102. An overcurrent protection limit 515 (shown in more detail in FIG. 20 as a trip latch) for detecting current conditions above a certain limit and an undervoltage detector 513 (shown in more detail in FIG. 14) for detecting undervoltage conditions may also be a part of ASIC 112. In one preferred embodiment, an undervoltage condition is defined as less than 8.5 volts in a drive circuit having an input voltage supply of 10 volts and a stable regulated output of 5 volts. In the event of an undervoltage condition occurring for a predetermined interval of time, the ASIC 112 resets the microprocessor 102. Overcurrent protection circuit 129A and overcurrent limit 515 provide the drive circuit with redundant over-current information. In the event of an overcurrent condition, the ASIC 112 disables the motor 114. ASIC 112 also includes a level shifter circuit 518 (shown in more detail in FIG. 15) and a current blanking circuit 516 (shown in more detail in FIG. 21) which allow microprocessor 102 to differentiate an actual overcurrent signal from a false one caused by noise in the circuit.

A PWM frequency selector 519 (shown in greater detail in FIG. 17) selects the frequency at which ECM 114 is pulse width modulated. Selector 519 is responsive to the frequency select (FS) signal provided via line 521 which selects a pseudo-random PWM frequency generator 524 (shown in more detail in FIG. 16) which provides a PWM signal via line 529. In the preferred embodiment, four frequencies are available: f8=18.6 kHz, f8.3=6.2 kHz, f10= 4.6 kHz and FR=pseudo random frequency. Selector 519 controls operation of the motor 114 by selecting a frequency of modulation for the pulse width modulating of the voltage applied to the motor 114. Relatively low PWM frequencies (e.g., frequencies less than 20 kHz) tend to generate acoustic noise audible by humans due to the natural resonant frequency of the various components of system 100. Higher PWM frequencies, however, cause greater heat dissipation problems in inverter power switches 124. Excessive heating is especially a problem in compact drives. The pseudo random PWM frequency generator 524 reduces the effect of acoustic noise generated by the ECM 114 allowing operation at lower PWM frequencies. The ASIC 112 continuously and pseudo-randomly varies the PWM frequency within a predefined range to reduce the annoying effects of single tone acoustic noise. In one preferred embodiment of the invention, the PWM frequency signal produced by selector 519 via line 529 is controlled by the frequency select signal (FS) provided by microprocessor 102 via line 521 and by a random sequence of numbers provided by generator 524 via line 526. As a result, the PWM frequency can be controlled from a frequency select signal provided by microprocessor 102. Data stored in PNVM 120 determined whether the PWM frequency is a fixed frequency or a variable frequency from a pseudo random sequence of numbers from generator 524.

Selector 519 may be a multiplexer circuit as described below. The function of the selector 519 can be expressed by the following equation:

$$fRND = fi * (N/16) \quad (N=0, 15)$$

where fRND, is the PWM frequency, fi is the input frequency to a binary rate multiplier (see FIG. 8), and N is binary number generated in a pseudo random manner. The selector 519 selects a PWM frequency from four available frequencies (f8, f8.3, f10, fR). A two bit signal (FS) is used to select frequency. The pseudo random frequency (fRND) is generated by a random number generator and the binary rate multiplier.

Figure 25:
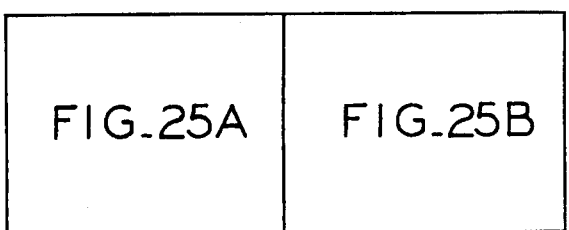
FIG. 25 is a layout diagram of FIGS. 25A–25C.
Figure 25A:
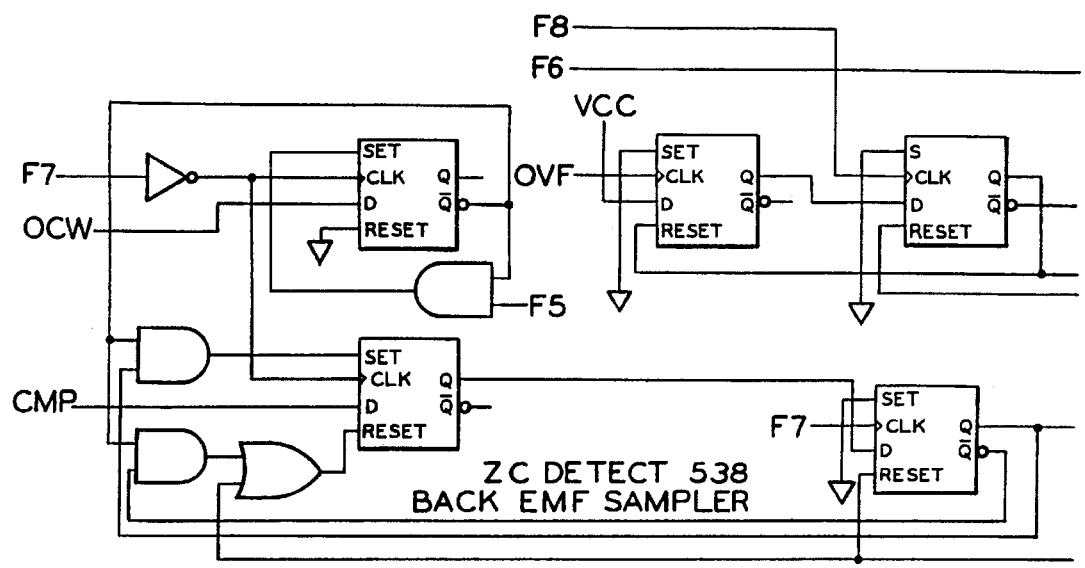
FIG. 25A–25C are schematic diagrams of one preferred embodiment of the zero crossing detector, flyback voltage detector and adaptive blanking circuit of the ASIC of FIG. 5.
Figure 25B:
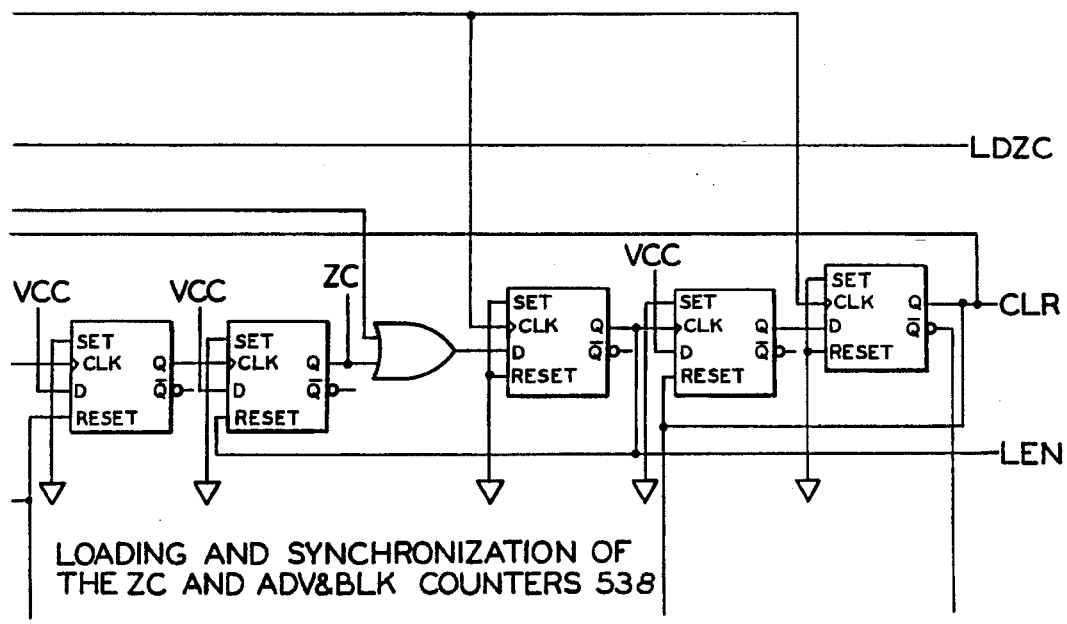
Figure 25C:
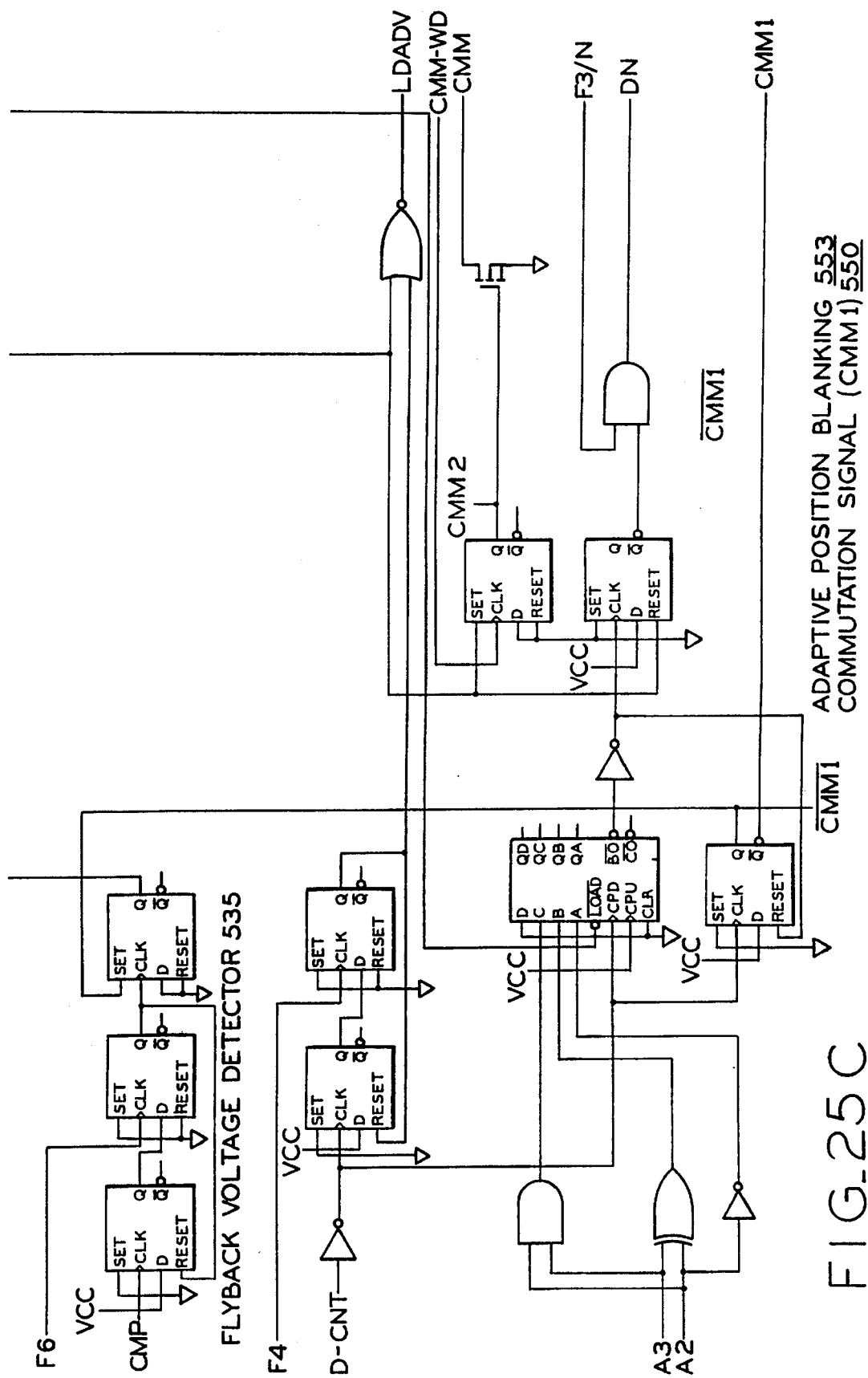

Referring to FIG. 5, rotor position sensing circuit 530 includes a back EMF selector circuit 541 (shown in more detail in FIG. 18) for selecting the motor phase voltage to be analyzed according to the state of the power switches 124. Selector 541 responds to the zero crossing detector signal provided via lines 127 by the position sensing circuit 126 (FIG. 1) such as back EMF sensing network 126A (FIG. 4). The digital signal representing selected motor phase voltage is provided to a flyback voltage detector 535 (see FIG. 25C) which detects the proximity of a zero crossing. Detector 535 enables a back EMF sampling circuit, such as zero crossing signal detector 538 (see FIGS. 25A and 25B), to initiate the zero crossing detection.

Figure 13:
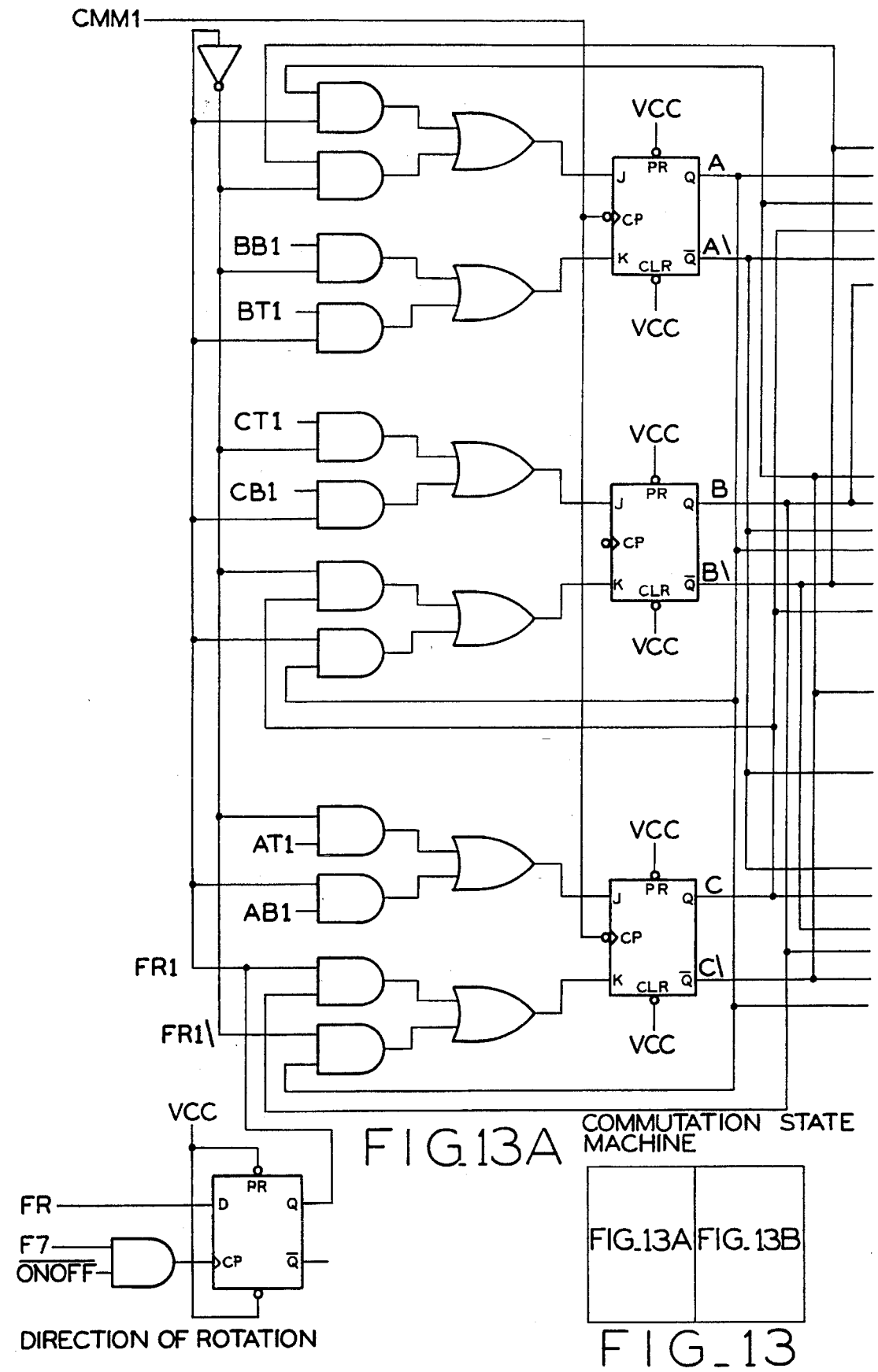
FIG. 13 is a layout diagram of FIGS. 13A–13B.
Figure 13B:
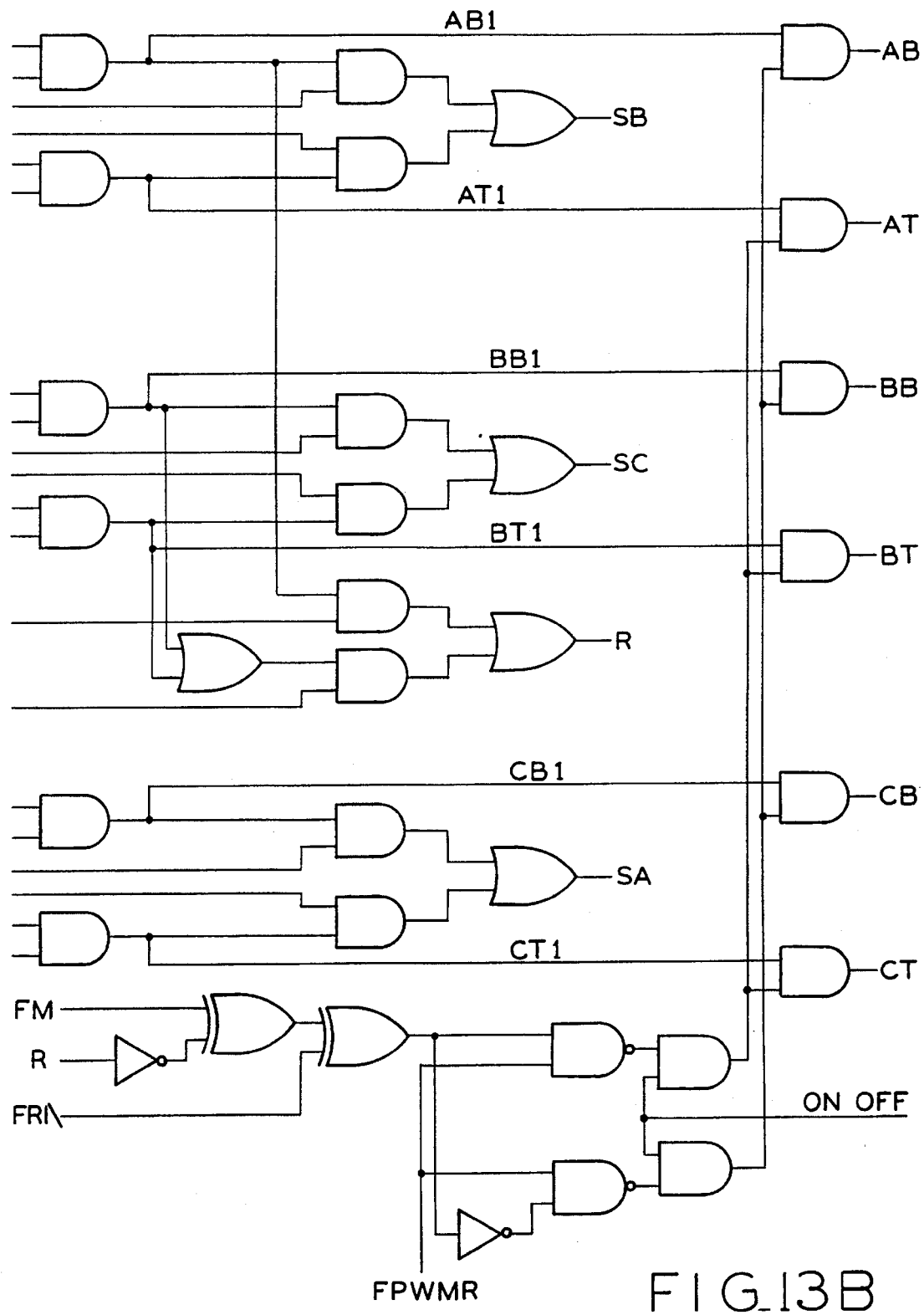

ASIC 112 includes a current regulating circuit (see FIG. 20), a commutation logic circuit (including a bidirectional state machine) and back EMF decoder 517 (see FIG. 13) which is a circuit for generating the commutation logic for the system 100. The commutation logic consists of a state machine which operates in response to the direction of rotation command (FR). The states are incremented or decremented in response to a commutation signal (CMM) which is generated by a commutation instant estimator circuit 550 (see FIG. 25C) responsive to the zero crossings detected by detector 538. The commutation signal (CMM) indicates the time instant for commutation of a motor phase. The back EMF decoder indicates the pair of the power switches 124 which are active during each state. Thus, two of the three phases of the motor 114 are active at any given time according to the state of sensed back EMF voltage. In one preferred embodiment, the circuit 517 has eight states and is designed in such a way that two of its eight possible states are forbidden (0 and 7). If these states are present when the system 100 is activated, it forces itself immediately to state one. Each state is decoded by the back emf decoder circuit. Two of the six power switches 124 are associated with each state so that at any time instant only two of power switches 124 are commanded on causing the energization of two of the three motor 114 phases.

The rotor position sensing circuit 530 of ASIC 112 also includes a drive watch dog or underspeed detector 532 (shown in more detail in FIG. 19). Detector 532 constantly monitors the ECM 114 rotor speed within each commutation interval and disables the motor 114 when rotor speed falls below a threshold speed. Since motor speed is compared to a threshold during every commutation interval, detector 532 also functions as stall detection circuitry.

The commutation instant estimator circuit 550 and an adaptive blanking circuit 553 (see FIGS. 23 and 25C), which is also a part of the rotor position sensing circuit 530, will be discussed in more detail below.

One aspect of ASIC 112 is shown in greater detail in FIG. 6. FIG. 6 illustrates a block diagram of the current blanking circuit 516 (shown in greater detail in FIG. 21). The diode recovery current, present after one of the power switching devices 124 is commanded on, causes erroneous current information in the current regulator comparator 432 in the form of a current spike. The amplitude of this current spike can be several times higher than the current level to be regulated. Blanking ignores the erroneous current information from current comparator 432 caused by the diode recovery current. A high to low transition of the current comparator 432 output reflects the presence of current spikes triggering a blanking time interval block 601. The width of the interval is selectable by input N via line 604. The generated blanking interval is propagated through a gate G1 if its occurrence is within a time interval, or window, of duration W as indicated by reference character 607. The window 607 is initiated at the beginning of the regulation cycle when the switches 124 are turned on. A gate G2 modifies the information from current comparator 432 by preventing the propagation of the low state of comparator 432 when the blanking signal from the blanking time interval block 601 and the window time interval signal 607 are present. The high to low transition of the output of gate G2 via line 610 during a window interval represents a true overcurrent signal and terminates the PWM current regulation cycle.

If the current regulate signal (low state) via line 609 occurs after the window interval of 607, then the signal is interpreted as a true current regulate signal and no blanking interval is generated. The action taken by an ASIC 112 current regulator in the presence of a current regulate signal via line 610 is to immediately terminate the PWM cycle.

The present invention includes blanking means rather than using filters to reduce the effects of erroneous information from the current comparator 432. Turning on and turning off events of power switches 124 cause current spikes due to the nature of semiconductor devices. Conventional techniques to reduce the effect of the current spikes require the use of low pass filter arrangements. The filtering of the current information from the shunt 430 is usually done before it is compared against the current reference by comparator 432. The time constant associated with a filter reduces the performance of the current comparator circuit 129B, particularly at low current levels.

Without blanking, a positive current spike at turn-on of switches 124 causes erroneous information about the motor phase current which prematurely terminates the current regulation PWM cycle, thus, causing a drop in phase current and a drop in torque. Blanking ignores the erroneous current information from current comparator 432 caused by the diode recovery current. A negative current spike at turn-off has no effect in this embodiment of the present invention since by the time of its occurrence, the PWM regulation cycle is already terminated.

Referring to FIG. 7, one aspect of the ASIC 112 is shown in greater detail in block diagram form. The reference current circuit 510 generates a digital signal representing a reference current of constant frequency and variable duty cycle generated by digital comparator 701 and flip flop 704 having a clock signal via line 710. In one preferred embodiment of the invention, digital comparator 701 may comprise ten exclusive NOR gates (see FIG. 22). One input signal to each XNOR gate is a bit from a ten-bit binary number representative of a desired maximum current magnitude. The binary number corresponds to a signal of a particular duty cycle, of which the analog equivalent is compared to phase current. The other input signal to each XNOR gate is one of ten signals of different frequencies. A logic level high output signal from the XNOR gates indicates that both input levels are the same. The outputs of each XNOR gate are connected to a NAND gate, the output signal of which is at a low level when the state of all individual comparators (i.e., each XNOR gate) is at logic level high indicating the occurrence of a match. The output of the multiple input NAND gate is connected to the reset input of flip flop 704 via line 707, thus, causing flip flop 704 to go to a low level until the next clock signal via line 710. The output signal of flip flop 701 is of constant frequency, as determined by the frequency of the clock signal via line 710, and of variable duty cycle, as determined by which 10-bit binary number is selected.

The PWM current reference signal is passed through a D/A converter 435 functioning as a low pass filter (outside the ASIC 112) and its output voltage is fed into analog comparator 432 for comparison with the voltage developed across shunt 430 (see FIG. 4).

The variable duty cycle signal generated by digital comparator 701 can also be used to synchronize new data that has previously been loaded into ASIC 112 from microprocessor 102.

Referring to FIG. 8, pseudo random number generator 524 (see FIG. 16) of ASIC 112 is shown in greater detail in block diagram form. Random number generator 524 may consist of a 16-bit closed loop shift register shown as integrated circuit blocks IC6 and IC7. The shift register is advanced or clocked at an input frequency fSHIFT. Gates IC4 and IC5 provide feedback and initialization of the shift register 5241.

A four-bit binary rate multiplier 5191 may be commanded by 16 possible binary combinations of N. Four binary numbers (corresponding to 0 through 3) are forbidden. Thus, ASIC 112 implements a mapping circuit in the form of IC2 and IC3 to provide the following relationship:

A=A', B=B', C=C' and D=(C'+D')+D' where A', B', C' and D' are outputs of the shift register circuit IC6 and IC7 and A, B, C and D are inputs to the binary rate multiplier 5191.

The mapping prevents the PWM frequency from being too low causing substantial loss in current which would result in a loss in torque and possibly a loss of rotor synchronism.

Figure 9:
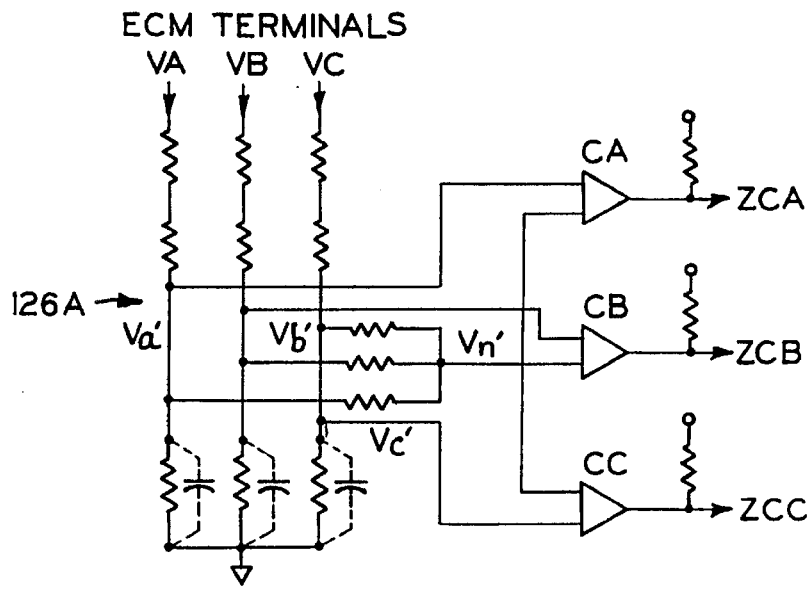
FIG. 9 is a schematic diagram of one preferred embodiment of the back EMF voltage sensing network shown in FIG. 4.

Referring to FIG. 9, the system 100 includes means for sensing the position of the rotatable assembly of the motor 114 such as a back EMF sensing network 126A. The position sensing network 126A senses the back EMF to provide a zero crossing detector signal (ZCA, ZCB, ZCC) to which ASIC 112 responds. The network 126A senses rotor position as a function of zero crossings of the difference between the back EMF voltage of windings of the motor 114 as compared to a reference level Vn' developed by a resistive network functioning as a voltage divider. ASIC 112 generates power switching control signals for power switches 124 in response to such position sensing.

In one preferred embodiment, the ECM 114 rotor position sensing network 126A is employed with a motor with star connected windings and with 120 degree conduction intervals. Two of the three motor windings are energized at any given time developing torque. The third winding is used for position sensing by observing the motor phase back EMF waves when current in the selected phase has decayed to zero.

The back EMF voltage waves are conditioned to a signal level using a voltage divider network as shown in FIG. 9. Back EMF sensing network 126A conditions the motor phase voltages Va, Vb, and Vc to signals Va', Vb', and Vc' for phases A, B, and C, respectively. A conditioned signal for the motor neutral voltage (Vn') is artificially generated as a reference level as a function of the conditioned signals of phases A, B, and C. If a neutral voltage (Vn) is available, its conditioned signal may be obtained in similar fashion to the other motor phases. Signals Va', Vb', and Vc' are compared against signal Vn' by comparators CA, CB and CC, respectively. Digital level high at the output of the comparators indicates that a phase's back EMF voltage magnitude is less than the neutral voltage. Conversely, a low level indicates that a phase's voltage magnitude is greater than the neutral voltage. The digital representation of back EMF voltages at the output of the comparators CA, CB or CC which indicates the polarity of the back EMF voltages is shown in FIG. 9 as ZCA, ZCB, and ZCC for phase A, phase B, and phase C, respectively. In the absence of pulse width modulation in the inverter power switches 124, the signals from the comparators CA, CB and CC are square waves except for a short time interval after each commutation. In presence of a PWM signal, noise generated during switching events of the power switches 124 deteriorates the signal from comparators CA, CB and CC to the extent that it cannot be used without further processing. If low pass filters are used to eliminate the noise effects generated by the PWM action, however, the motor 114 high speed performance deteriorates because the filter time constant affect the angle at which commutation takes place.

Detecting the time instants of the zero crossing of the back EMF waves consists of sampling the back EMF voltage waves during periods when the noise generated by turning on and turning off events of the enabled power switches 124 is at a minimum. Turning power switches 124 on or off generates current spikes by the recovery of semiconductor switching devices. The transient voltages generated by these spikes cause erroneous information on the conditioned signals Va', Vb', Vc' and Vn' as well as on the zero crossing detection. The system 100 samples the comparator CA, CB or CC output of the selected motor phase, A, B or C, before the turning on event takes place. There is a time delay from the instant one of the power switches 124 is commanded on to the instant the switch actually turns on. When pulse width modulation is being executed, the back EMF sampling instances coincide with the beginning of the PWM cycle. If the PWM frequencies are synchronized, the sampling frequency may be selected to be the same for all the PWM frequency modes of the motor 114.

The turning off effect of power switches 124 is eliminated by disregarding the sample of back EMF which is sampled at the time a pair of power switches 124 is turned off or during an interval immediately after the turn off occurrence. This interval is long enough for the effect of the turning off to be extinguished. Circuit 126A detects the change in state of the sampled values of the back EMF. This change of state represents the zero crossing of the phase back EMF. At turn off, a time interval (OCW) is initiated. If the back EMF from comparator CA, CB or CC is sampled during this time interval, then, the sampled information is ignored.

The voltage of the selected motor phase back EMF immediately after the motor 114 winding is commutated off is referred to as a flyback voltage. The output of the flyback voltage circuit 535 is kept at a defined level for the duration of a blanking interval. As soon as the output of a comparator CA, CB or CC of the selected back EMF phase indicates a positive transition (indicating the proximity to a zero crossing and the output (low level) of flyback detector circuit 535 changes state enabling the zero cross sampling circuit 538.

High level output of circuit 535 keeps the sampling circuit 538 in a reset state, thus, allowing back EMF sampling only in an interval near the zero crossing occurrence. This helps eliminate the effect of noise when a zero crossing is not expected.

Figure 10:
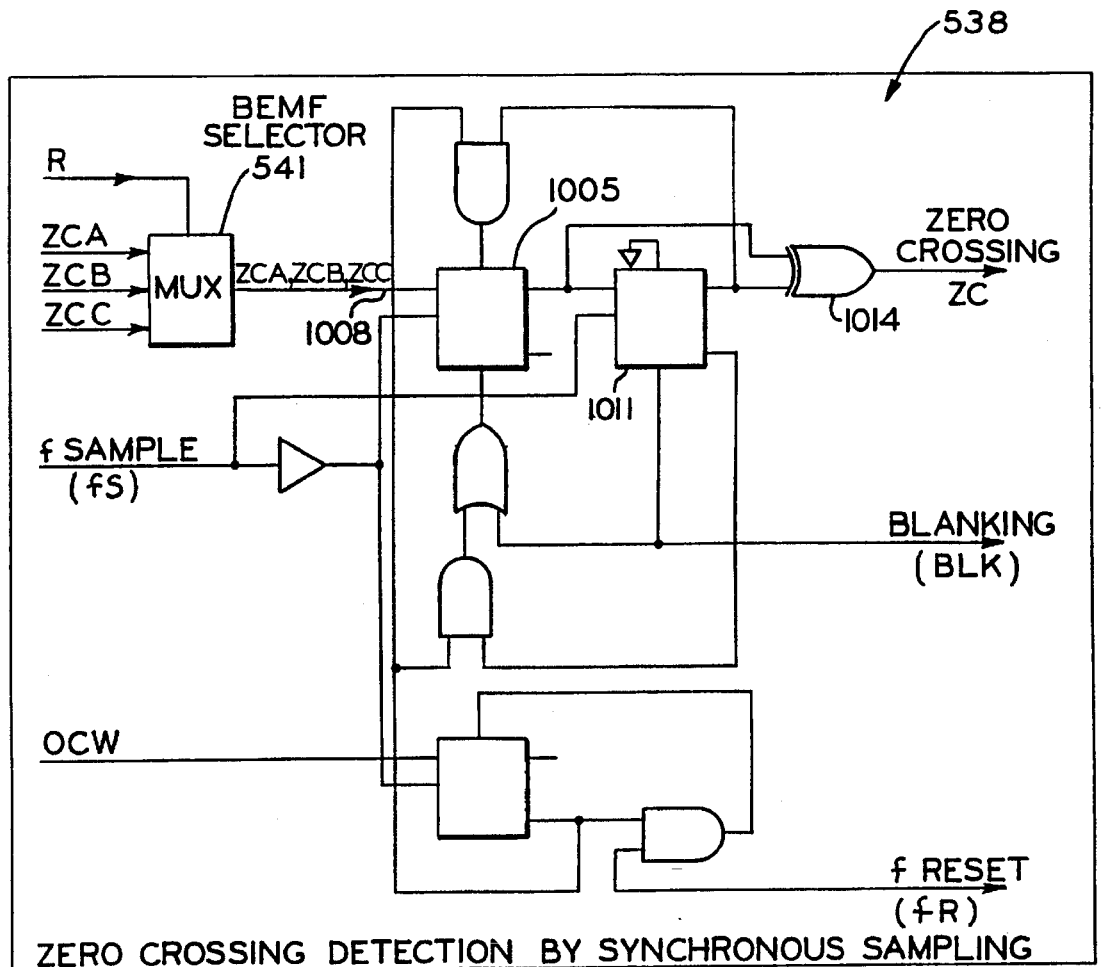
FIG. 10 is a schematic diagram of one preferred embodiment of the zero crossing detector, employing synchronous sampling, of the ASIC shown in FIG. 5.

FIG. 10 shows a schematic of a zero crossing detection circuit 538 (shown in more detail in FIGS. 25A and 25B) of ASIC 112 employing synchronous sampling. The back EMF selector 541 embodied as a multiplexer (MUX) (see FIG. 18) takes information from the zero cross comparators CA, CB or CC and selects the phase of motor 114 of which the zero cross signal's proximity to zero is expected as indicated by signals SA, SB, SC provided by decoder 517 (see FIG. 13). Selector 541 ensures that the polarity of the selected zero crossing signal is always the same regardless of the transition to zero of the back EMF waves. Flip-flop IC 1005 samples this signal via line 1008 provided that a blanking signal (BLK) is logic level low to indicate that it is not a blanking interval. At the positive going transition of the sampling frequency (fS), the information sampled and saved in IC 1005 is transferred to IC 1011. At the following cycle, new information is sampled and stored in IC 1005. If this new information is different from the previous sample stored in IC 1011, gate 1014 changes its state indicating the occurrence of a zero crossing; if not, the sampling process continues. If the selected zero crossing signal is sampled within the interval in which the overcurrent window (OCW) signal is at low level the sampled information is ignored by copying the information stored in IC 1011 to IC 1005. This prevents the zero crossing detection gate 1014 from being activated in presence of information that may be erroneous.

The occurrence of the zero crossing initiates a counter (shown in more detail in FIG. 23) for measuring the elapsed time between zero crossings. The ASIC 112 controls commutation as a function of the elapsed time. The signals from the back EMF comparators CA, CB and CC (ZCA, ZCB, and ZCC) are combined into one signal representing the composite back EMF signal for the three phases. Back emf selector 541 (see FIG. 18) selects the motor phase voltage to be analyzed according to the state of the power switches 124 as commanded by the commutation logic output of decoder 517 in FIG. 13. The motor phase to be analyzed is the one that is not producing torque, i.e., is not conducting current.

The commutation instances of a motor 114 phase are determined from the information from the zero crossings of that phase. Torque production in a phase of motor 114 is determined by the current circulating in that motor phase. At low speeds, for example, it is convenient to energize a winding of motor 114 when it is experiencing maximum rotor flux. That is, the motor 114 phase must be energized 30 electrical degrees after the zero crossing. At high speeds, it is convenient to energize the motor 114 before the particular winding is exposed to the maximum rotor flux. This permits phase current to build up in the presence of higher motor impedance and higher opposing back EMF.

Referring to FIG. 11, commutation consists of determining the time interval between two consecutive zero crossings of the motor back EMF waves and the time instant a motor phase is commutated. FIG. 11 depicts a preferred commutation strategy. The zero crossings ZC at intervals N−1, N, N+1 and N+2 of FIG. 11(a) as detected by the zero crossing signal detector circuit 538 are indicated as narrow digital level signals. FIG. 11(b) indicates the analog equivalent output of zero crossing counters starting from zero count at the beginning of a zero cross signal ZC(N1) at time (N−1) and ending at the occurrence of another zero cross signal ZC(N) at time (N). The state of the counters at this instance CNT(N) indicates the time interval between two consecutive zero crossings of the back EMF waves. This time interval is equivalent to the angular position of 60 electrical degrees. The commutation instant CMM(N) of FIG. 11(d) is estimated by circuit 550 which uses the time interval of the immediate past zero crossing interval CNT(N) as follows. At the time of the occurrence of ZC(N), the information between the two consecutive zero crossings CNT(N) is saved and the counters are reset to zero to start measuring the following zero crossing interval ZC(N+1). The saved information is loaded into a set of binary counters which count down starting from the loaded count down towards zero count. The frequency of the down counters is variable and higher than that of the incrementally counting zero cross counters. The first zero count of the down counters indicates the commutation instant time CMM(N). The angular distance from the occurrence of the zero crossing to the time the next commutation takes place is referred to here as commutation angle. This angle is determined by the initial count and the frequency at which the down counters are clocked. The flexibility in changing the commutation angle allows optimum commutation of the motor phases. Four bits loaded serially from microprocessor 102 select the angle by selecting a frequency at which the down counters operate. Changing the commutation angle according to changes in motor speed optimizes the drive performance of ECM 114. After the commutation, the down counters are loaded again with the same zero cross interval count previously saved. The time interval between the time a commutation takes place and the time instant the last down count of the down counters reaches zero is the blanking interval (BLK). Reloading of the down counters may occur several times for larger blanking intervals as referred to as adaptive blanking 553. FIG. 11(c) shows blanking intervals (i.e., BLK1, BLK2 . . . ) which are made from various reloading of the down counters. The blanking interval prevents the use of information from the zero crossing comparators CA, CB and CC immediately after a motor 114 winding is commutated and the inductive current in this phase is decaying to zero. The system 100 can provide a blanking interval which adapts inversely proportional to the advance angle. Therefore, microprocessor 102 constitutes means for blanking as a function of the interval between zero crossings and commutation with zero crossings in the interval following commutation being ignored. Microprocessor 102 may vary the length of the blanking interval.

At standstill, where there is no back EMF voltage available, an open loop stepping sequence which sequentially steps the commutation logic 517 in the selected direction of rotation is initiated. Two of the three phases of 114 motor are energized at each time interval and the logic 517 is rotated at a fixed frequency set by the overflow of the zero cross counters (15 RPM for a 12 pole ECM). As soon as the rotor of shaft 116 moves in response to the stepping action, the zero crossing detection circuit 538 starts observing the zero crossing of the back EMF waves. If a zero crossing is found, the open loop sequence is automatically overridden so that the back EMF sensing scheme smoothly takes over control of the power switches 124 commutation sequencing. If no zero crossing is found, the open loop sequence continues rotating the state machine of commutation logic 517 at the same speed until a zero crossing is found. Further, the stepping action is accompanied by a linear increase, or ramp, in the current reference. The minimum and maximum values of the current reference and the duration of the ramp are a predetermined function of the inertia of the load and the acceleration required. Large inertia loads may require a different current profile while stepping action is executed.

Referring to FIG. 12, commutation is shown in the form of a timing diagram for the forward sequence. FIG. 12(a) shows an idealized representation EA, EB and EC of the back EMF voltages for phases A, B and C of motor 114. FIG. 12(b) shows the outputs of comparators CA, CB and CC. Slow and fast commutation schemes are used in the preferred embodiment of the invention. Slow commutation, where only one of power switches 124 executes PWM at any given instant, is shown in FIG. 12(c) by the states of gate drives 130. A high logic level indicates that the corresponding power devices 124 are on (closed switch) and a low logic level indicates that the corresponding power devices 124 are off (open switch). FIG. 12(c) also indicates which motor phases are energized and which phase is being used to detect back EMF for rotor position sensing. Additionally, FIG. 12(c) shows the relationship between the commutation and the states of commutation logic 517. FIG. 12(d) shows the digital signals used to select the proper back EMF signal for sensing including the composite back EMF output signal (CMP) for obtaining zero crossings, the polarity adjustment signal R and the zero cross signal. Signal CMP at the position sensing MUX 541 represents the selected back EMF signal being observed (ZCA, ZCB, ZCC).

Figure 12A:
FIGS. 12a–12d are timing diagrams illustrating one preferred embodiment of commutation and sequencing of the invention.
Figure 12B:
Figure 12C:
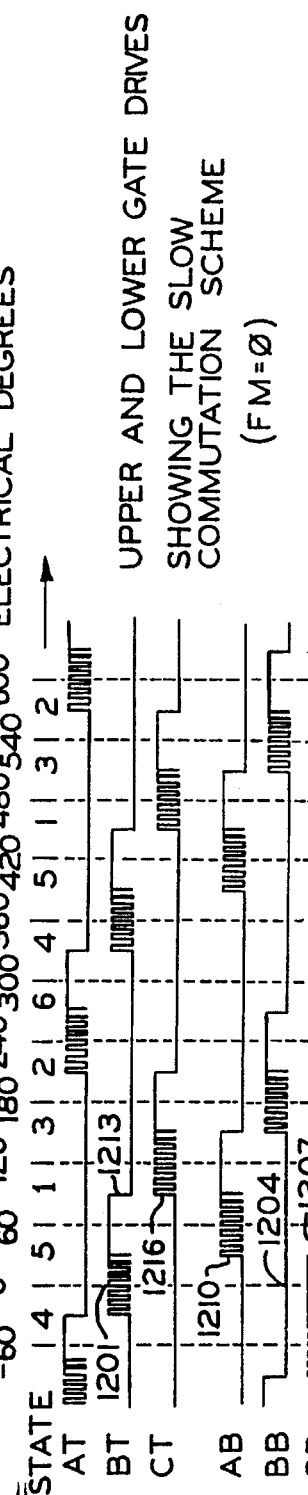
Figure 12D:
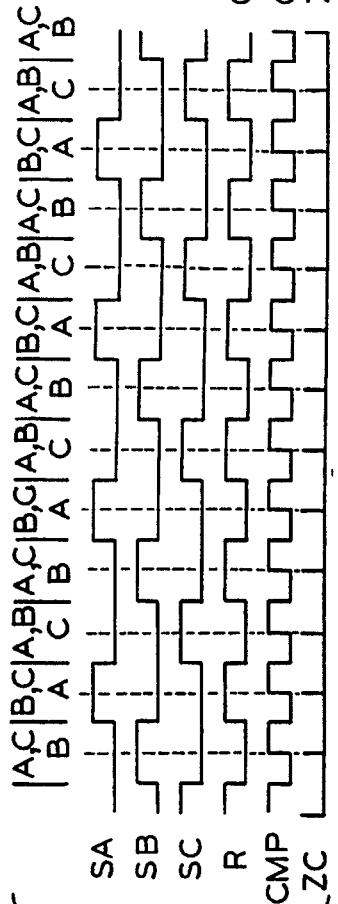

Referring to FIG. 12(c), at 0°, reference character 1201 indicates that the B phase of motor 114 is conducting as gate drive 418 is driving power switch 408. Switch 408 is executing PWM. At 1204 the C phase is energized by driver 421 driving switch 411. The A phase is used for back EMF sensing at this time. The C phase is opened at reference 1207 and the A phase is closed at reference character 1210. PWM is now being executed on switch 407 and no longer on switch 408. From 0° to 60° indicates state 5 of the state machine of commutation logic 517. With the A phase energized, the B phase is opened at 1213 and the C phase energized at 1216. Note that two phases are energized at each instant.

In view of the above, it will be seen that the advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A system for driving an indoor blower of a heating, ventilating, and/or air conditioning (HVAC) system in response to a system control signal provided by a central means, the system control signal having a BLOWER DEMAND state and a BLOWER END DEMAND state, said system comprising:

a motor having a stationary assembly and a rotatable assembly in magnetic coupling relation to the stationary assembly, the rotatable assembly in driving relation to the indoor blower;

a memory for storing parameters defining a first air flow rate and a second air flow rate less than the first air flow rate and defining a period of time of reduced air flow corresponding to the second air flow rate; and a controller, connected to and responsive to the memory, controlling air flow rate of the HVAC system in response to the system control signal, the controller comprising a circuit controlling speed or torque of said motor to operate said system at the first air flow rate in response to the BLOWER DEMAND state of the system control signal and controlling the speed or torque of said motor to operate said system for the period of time at the second air flow rate in response to the BLOWER END DEMAND state of the system control signal.

2. The system of claim 1 wherein the central means comprises a thermostat providing a temperature signal having a first state corresponding to the BLOWER DEMAND state and having a second state corresponding to the BLOWER END DEMAND state.

3. The system of claim 1 wherein the central means comprises a blower controller providing a blower activation command corresponding to the BLOWER DEMAND state and a blower deactivation command corresponding to the BLOWER END DEMAND state.

4. The system of claim 1 further comprising a circuit controlling speed or torque of the motor to operate said system at a third air flow rate greater than the first air flow rate when the BLOWER DEMAND state of the system control signal has been present for a second period of time.

5. The system of claim 1 wherein the memory comprises a programmable memory that stores parameters defining the relationship between motor air flow rate and air flow, parameters defining air flow rates for different system capacities, parameters defining turn-on and turn-off time delays and parameters defining periods of increased air flow and further comprising means for selecting at least one parameter stored in the memory.

6. The system of claim 5 wherein said means for selecting at least one parameter stored in the memory is responsive to the system control signal.

7. The system of claim 5 further comprising means for defining an air flow rate responsive to the selected parameter.

8. The system of claim 5 wherein the parameters include information corresponding to motor air flow rate.

9. The system of claim 5 wherein the memory stores parameters representative of an operation of said motor, said motor being in combination with the HVAC system.

10. The system of claim 1 wherein the controller includes means for reading the parameters stored in memory.

11. A system for driving an indoor blower of a heating, ventilating, and/or air conditioning (HVAC) system in response to a system control signal provided by a central means, the system control signal having a BLOWER DEMAND state and a BLOWER END DEMAND state, said system comprising:

a motor having a stationary assembly and a rotatable assembly in magnetic coupling relation to the stationary assembly, the rotatable assembly in driving relation to the indoor blower; and means for controlling air flow rate of the HVAC system in response to the system control signal, the controlling means comprising means for controlling speed or torque of said motor to operate said system at a first air flow rate in response to the BLOWER DEMAND state of the system control signal and means for controlling the speed or torque of said motor to operate said system at a second air flow rate greater than the first air flow rate when the BLOWER DEMAND state of the system control signal has been present for a period of time.

12. The system of claim 11 wherein the central means comprises a thermostat providing a temperature signal having a first state corresponding to the BLOWER DEMAND state and having a second state corresponding to the BLOWER END DEMAND state.

13. The system of claim 11 wherein the central means comprises a blower controller providing a blower activation command corresponding to the BLOWER DEMAND state and a blower deactivation command corresponding to the BLOWER END DEMAND state.

14. The system of claim 11 wherein the second air flow rate corresponds to an air flow rate for maximizing capacity of said HVAC system and wherein the first air flow rate corresponds to an air flow rate for maximizing efficiency of said HVAC system.

15. The system of claim 11 wherein said means for operating said system at a second air flow rate comprises means for monotonically increasing the air flow rate of said system from the first air flow rate to the second air flow rate.

16. The system of claim 11 wherein said means for operating said system at a second air flow rate comprises means for sequentially stepping the air flow rate of said system from the first air flow rate to the second air flow rate.

17. The system of claim 11 further comprising a humidistat for providing a humidity signal representative of the level of humidity in a room, the humidity signal having a first state corresponding to an unacceptable level of humidity and a second state corresponding to an acceptable level of humidity, and further comprising means for preventing operation of said system at the second air flow rate when the first state of the humidity signal is present.

18. The system of claim 11 further comprising means for ending operation of said system at the second air flow rate in response to the BLOWER END DEMAND state of the system control signal.

19. The system of claim 11 further comprising means for controlling speed or torque of said motor to operate said system for a second period of time at a third air flow rate less than the second air flow rate in response to the BLOWER END DEMAND state of the system control signal.

20. The system of claim 19 wherein the third air flow rate is less than the first air flow rate.

21. The system of claim 11 further comprising a programmable memory, connected to and providing parameters to the controller, for storing parameters defining the relationship between motor air flow rate and air flow, parameters defining air flow rates for different system capacities, parameters defining turn-on and turn-off time delays, parameters defining periods of reduced air flow and parameters defining periods of increased air flow and further comprising means for selecting at least one parameter stored in the memory.

22. The system of claim 21 wherein said means for selecting at least one parameter stored in the memory is responsive to the system control signal.

23. The system of claim 21 further comprising means for defining an air flow rate responsive to the selected parameter.

24. The system of claim 21 wherein the parameters include information corresponding to motor air flow rate.

25. The system of claim 21 wherein the memory stores parameters representative of an operation of said motor, said motor being in combination with the HVAC system.

26. A system for driving an indoor blower of a heating, ventilating, and/or air conditioning (HVAC) system in response to a system control signal provided by a central means, the system control signal having a BLOWER DEMAND state and a BLOWER END DEMAND state, said system comprising:

a motor having a stationary assembly and a rotatable assembly in magnetic coupling relation to the stationary assembly, the rotatable assembly in driving relation to the indoor blower; and means for controlling air flow rate of the HVAC system in response to the system control signal, the controlling means comprising means for controlling the speed or torque of said motor to operate said system at a first air flow rate in response to the BLOWER DEMAND state of the system control signal, means for controlling the speed or torque of said motor to operate said system at a second air flow rate greater than the first air flow rate when the BLOWER DEMAND state of the system control signal has been present for a first period of time and means for controlling the speed or torque of said motor to operate said system for a second period of time at a third air flow rate less than the second air flow rate in response to the BLOWER END DEMAND state of the system control signal.

27. The system of claim 26 wherein the third air flow rate is less than the first air flow rate.

28. A system for heating, ventilating, and/or air conditioning (HVAC) comprising:

central means for providing a control signal having a BLOWER DEMAND state and BLOWER END DEMAND state;

an indoor blower;

a motor having a stationary assembly and a rotatable assembly in magnetic coupling relation to the stationary assembly, the rotatable assembly in driving relation to the indoor blower;

a memory for storing parameters defining a first air flow rate and a second air flow rate less than the first air flow rate and defining a period of time of reduced air flow corresponding to the second air flow rate; and a controller, connected to and responsive to the memory, controlling air flow rate of the HVAC system in response to the system control signal, the controller comprising a circuit controlling the speed or torque of said motor to operate said system at the first air flow rate in response to the BLOWER DEMAND state of the system control signal and controlling the speed or torque of said motor to operate said system for the period of time at the second air flow rate in response to the BLOWER END DEMAND state of the system control signal.

29. A system for heating, ventilating, and/or air conditioning (HVAC) comprising:

central means for providing a system control signal having a BLOWER DEMAND state and a BLOWER END DEMAND state;

an indoor blower;

a motor having a stationary assembly and a rotatable assembly in magnetic coupling relation to the stationary assembly, the rotatable assembly in driving relation to the indoor blower; and means for controlling air flow rate of the HVAC system in response to the system control signal, the controlling means comprising means for controlling speed or torque of said motor to operate said system at a first air flow rate in response to the BLOWER DEMAND state of the system control signal and means for controlling speed or torque of said motor to operate said system at a second air flow rate greater than the first air flow rate when the BLOWER DEMAND state of the system control signal has been present for a period of time.

30. A method of operating a system for driving an indoor blower of a heating, ventilating, and/or air conditioning (HVAC) system in response to a system control signal provided by a central means, the system control signal having a BLOWER DEMAND state and a BLOWER END DEMAND state, said system having a motor having a stationary assembly and a rotatable assembly in magnetic coupling relation to the stationary assembly, the rotatable assembly in driving relation to the indoor blower, a memory for storing parameters, a controller which is responsive to the memory for controlling speed or torque of the motor; said parameters defining a first air flow rate and a second air flow rate less than the first air flow rate; and said parameters defining a period of time reduced air flow corresponding to the second air flow rate; said method comprising the steps of:

controlling speed or torque of the motor to operate said system at the first air flow rate as defined by the parameters in memory in response to the BLOWER DEMAND state of the system control signal; and controlling speed or torque of the motor to operate said system for the period of time at the second air flow rate as defined by the parameters in memory in response to the BLOWER END DEMAND state of the system control signal.

31. The method of claim 30 comprising the step of storing in a memory parameters defining the first and second air flow rate and the period of time.

32. A method of operating a system for driving an indoor blower of a heating, ventilating, and/or air conditioning (HVAC) system in response to a system control signal provided by a central means, the system control signal having a BLOWER DEMAND state and a BLOWER END DEMAND state, said system having a motor having a stationary assembly and a rotatable assembly in magnetic coupling relation to the stationary assembly, the rotatable assembly in driving relation to the indoor blower, said method comprising:

controlling speed or torque of the motor to operate said system at a first air flow rate in response to the BLOWER DEMAND state of the system control signal; and controlling speed or torque of the motor to operate said system at a second air flow rate greater than the first air flow rate when the BLOWER DEMAND state of the system control signal has been present for a period of time.

33. A system for driving an indoor blower of a heating, ventilating, and/or air conditioning (HVAC) system in response to a system control signal provided by a central means, the system control signal having a BLOWER DEMAND state and a BLOWER END DEMAND state, said system comprising:

a motor having a stationary assembly and a rotatable assembly in magnetic coupling relation to the stationary assembly, the rotatable assembly in driving relation to the indoor blower;

a memory for storing parameters defining a first air flow rate and a second air flow rate less than the first air flow rate and defining a period of time of reduced air flow corresponding to the second air flow rate; and a controller, connected to and responsive to the memory, controlling air flow rate of the HVAC system in response to the system control signal, the controller comprising a circuit controlling speed or torque of said motor to operate said system at the first air flow rate in response to the BLOWER DEMAND state of the system control signal and controlling speed or torque of said motor to operate said system for the period of time at the second air flow rate less than the first air flow rate in response to the BLOWER END DEMAND state of the system control signal.

34. The system of claim 33 wherein the memory comprises a programmable memory for storing the first and second air flow rate and the period of time.

35. A system for driving an indoor blower of a heating, ventilating, and/or air conditioning (HVAC) system in response to a system control signal provided by a central means, the system control signal having a BLOWER DEMAND state and a BLOWER END DEMAND state, said system comprising:

a motor having a stationary assembly and a rotatable assembly in magnetic coupling relation to the stationary assembly, the rotatable assembly in driving relation to the indoor blower; and a controller controlling air flow rate of the HVAC system in response to the system control signal, the controller comprising a circuit controlling speed or torque of said motor to operate said system at a first air flow rate in response to the BLOWER DEMAND state of the system control signal and controlling speed or torque of said motor to operate said system at a second air flow rate greater than the first air flow rate when the BLOWER DEMAND state of the system control signal has been present for a period of time.

36. A system for driving an indoor blower of a heating, ventilating, and/or air conditioning (HVAC) system in response to a system control signal provided by a central means, the system control signal having a BLOWER DEMAND state and a BLOWER END DEMAND state, said system comprising:

a motor having a stationary assembly and a rotatable assembly in magnetic coupling relation to the stationary assembly, the rotatable assembly in driving relation to the indoor blower; and a controller controlling air flow rate of the HVAC system in response to the system control signal, the controller comprising a circuit controlling speed or torque of said motor to operate said system at a first air flow rate in response to the BLOWER DEMAND state of the system control signal and controlling speed or torque of said motor to operate said system for a period of time at a second air flow rate less than the first air flow rate in response to the BLOWER END DEMAND state of the system control signal and operating said system at a third air flow rate greater than the first air flow rate when the BLOWER DEMAND state of the system control signal has been present for a second period of time.

37. The system of claim 36 wherein the third air flow rate corresponds to an air flow rate for maximizing capacity of said HVAC system and wherein the first air flow rate corresponds to an air flow rate for maximizing efficiency of said HVAC system.

38. The system of claim 36 wherein said circuit controls speed or torque of said motor to operate said system at a third air flow rate comprises means for monotonically increasing the air flow rate of said system from the first air flow rate to the third air flow rate.

39. The system of claim 36 wherein said circuit controls speed or torque of said motor to operate said system at a third air flow rate comprises means for sequentially stepping the air flow rate of said system from the first air flow rate to the third air flow rate.

40. The system of claim 36 further comprising a humidistat for providing a humidity signal representative of the level of humidity in a room, the humidity signal having a first state corresponding to an unacceptable level of humidity and a second state corresponding to an acceptable level of humidity, and further comprising means for preventing operation of said system at the third air flow rate when the first state of the humidity signal is present.

41. The system of claim 36 further comprising means for ending operation of said system at the third air flow rate in response to the BLOWER END DEMAND state of the system control signal.

42. A system for driving an indoor blower of a heating, ventilating, and/or air conditioning (HVAC) system in response to a system control signal provided by a central means, the system control signal having a BLOWER DEMAND state and a BLOWER END DEMAND state, said system comprising:

a motor having a stationary assembly and a rotatable assembly in magnetic coupling relation to the stationary assembly, the rotatable assembly in driving relation to the indoor blower;

means for storing parameters in a memory connected to the controller defining a first air flow rate and a second air flow rate less than the first air flow rate and defining a period of time of reduced air flow corresponding to the second air flow rate; and means for controlling air flow rate of the HVAC system in response to the system control signal, the controlling means comprising means for controlling speed or torque of said motor to operate said system at the first air flow rate in response to the BLOWER DEMAND state of the system control signal and means for controlling speed or torque of said motor to operate said system for the period of time at the second air flow rate in response to the BLOWER END DEMAND state of the system control signal.

43. A system for driving an indoor blower of a heating, ventilating, and/or air conditioning (HVAC) system in response to a system control signal provided by a central means, the system control signal having a BLOWER DEMAND state and a BLOWER END DEMAND state, said system comprising:

a motor having a stationary assembly and a rotatable assembly in magnetic coupling relation to the stationary assembly, the rotatable assembly in driving relation to the indoor blower; and a controller controlling air flow rate of the HVAC system in response to the system control signal, the controller comprising a circuit controlling speed or torque of said motor to operate said system at a first air flow rate in response to the BLOWER DEMAND state of the system control signal and controlling speed or torque of said motor to operate said system at a second air flow rate greater than the first air flow rate when the BLOWER DEMAND state of the system control signal has been present for a period of time.

44. A system for driving an indoor blower of a heating, ventilating, and/or air conditioning (HVAC) system in response to a system control signal provided by a central means, the system control signal having a BLOWER DEMAND state and a BLOWER END DEMAND state, said system comprising:

a motor having a stationary assembly and a rotatable assembly in magnetic coupling relation to the stationary assembly, the rotatable assembly in driving relation to the indoor blower;

a memory for storing parameters defining a first air flow rate and a second air flow rate less than the first air flow rate and defining a period of time of reduce air flow corresponding to the second air flow rate; and a controller, connected to and responsive to the memory, controlling the speed or torque of the motor in response to the system control signal thereby controlling air flow rate of the HVAC system, the controller comprising a circuit operating said system at the first speed or torque in response to the BLOWER DEMAND state of the system control signal and operating said system for the period of time at the second speed or torque in response to the BLOWER END DEMAND state of the system control signal.

45. A system for driving an indoor blower of a heating, ventilating, and/or air conditioning (HVAC) system in response to a system control signal provided by a central means, the system control signal having a BLOWER DEMAND state and a BLOWER END DEMAND state, said system comprising:

a motor having a stationary assembly and a rotatable assembly in magnetic coupling relation to the stationary assembly, with the rotatable assembly being in driving relation to the indoor blower; and means for controlling the speed or torque of the motor in response to the system control signal thereby controlling air flow rate of the HVAC system, the controlling means comprising means for operating said motor at a first speed or torque in response to the BLOWER DEMAND state of the system control signal and means for operating said motor at a second speed or torque greater than the first speed or torque when the BLOWER DEMAND state of the system control signal has been present for a period of time.

* * * * *